(12) United States Patent
Maltsev et al.

(10) Patent No.: US 9,999,046 B2
(45) Date of Patent: Jun. 12, 2018

(54) SECTOR LEVEL SWEEP FOR MILLIMETER-WAVE MULTIPLE OUTPUT COMMUNICATIONS

(71) Applicant: Intel Corporation, Santa Clara, CA (US)

(72) Inventors: Alexander Alexandrovich Maltsev, Nizhny Novgorod (RU); Artyom Lomayev, Nizhny Novgorod (RU); Carlos Cordeiro, Portland, OR (US); Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 14/978,330

(22) Filed: Dec. 22, 2015

(65) Prior Publication Data

US 2017/0079031 A1    Mar. 16, 2017

Related U.S. Application Data

(60) Provisional application No. 62/217,242, filed on Sep. 11, 2015, provisional application No. 62/218,602, filed on Sep. 15, 2015.

(51) Int. Cl.
*H04B 7/04*    (2017.01)
*H04W 72/04*    (2009.01)
(Continued)

(52) U.S. Cl.
CPC ...... *H04W 72/0446* (2013.01); *H04B 7/0408* (2013.01); *H04B 7/0452* (2013.01);
(Continued)

(58) Field of Classification Search
CPC ............ H04W 72/0446; H04W 72/046; H04B 7/0408; H04B 7/0452
See application file for complete search history.

(56) References Cited

U.S. PATENT DOCUMENTS 9,813,131 B2    11/2017    Maltsev et al.
2009/0232240 A1    9/2009    Lakkis
(Continued)

FOREIGN PATENT DOCUMENTS

CN    107078775 A    8/2017
WO    WO-2016018168 A1    2/2016

OTHER PUBLICATIONS

"U.S. Appl. No. 15/128,073, Examiner Interview Summary dated Jun. 9, 2017", 3 pgs.
(Continued)

*Primary Examiner* — Noel Beharry
*Assistant Examiner* — Nicole King
(74) *Attorney, Agent, or Firm* — Schwegman Lundberg & Woessner, P.A.

(57) ABSTRACT

Generally discussed herein are devices and methods for MIMO communications. A device can include processing circuitry (e.g., PHY and/or MAC layer circuitry) configured to transmit an enhanced sector sweep (ESSW) frame for each of a plurality of transmit sectors, wherein each of the plurality of transmit sectors correspond to a weight vector for the first plurality of antennas, each ESSW frame including a plurality of training units to simultaneously beamforming train one or more responder STAs, receive an SSW feedback frame, each SSW feedback frame indicating a transmit sector of the plurality of transmit sectors and a receive sector of a corresponding STA of the one or more STAs to be used in communication between the initiator STA and the responder STA, and transmit one or more SSW acknowledgement frames to the one or more responder STAs to verify the transmit sector and receive sector to use for communication.

20 Claims, 13 Drawing Sheets

(51) Int. Cl.
*H04B 7/0452* (2017.01)
*H04B 7/0408* (2017.01)
*H04B 7/0491* (2017.01)
*H04B 7/06* (2006.01)
*H04B 7/08* (2006.01)

(52) U.S. Cl.
CPC ......... *H04B 7/0491* (2013.01); *H04B 7/0617* (2013.01); *H04B 7/0848* (2013.01); *H04W 72/046* (2013.01)

(56) References Cited

U.S. PATENT DOCUMENTS

| | | | | |
|---|---|---|---|---|
| 2014/0235287 A1* | 8/2014 | Maltsev | .............. | H04W 52/267 455/522 |
| 2015/0244432 A1* | 8/2015 | Wang | .................. | H04B 7/0695 375/267 |
| 2016/0043781 A1 | 2/2016 | Cho | | |
| 2016/0044711 A1* | 2/2016 | Lou | .................. | H04W 74/0816 370/338 |
| 2017/0111095 A1 | 4/2017 | Maltsev et al. | | |

OTHER PUBLICATIONS

"U.S. Appl. No. 15/128,073, Non Final Office Action dated Mar. 8, 2017", 14 pgs.
"U.S. Appl. No. 15/128,073, Notice of Allowance dated Jul. 7, 2017", 5 pgs.
"U.S. Appl. No. 15/128,073, Preliminary Amendment filed Sep. 21, 2016", 3 pgs.
"U.S. Appl. No. 15/128,073, Response filed Jun. 7, 2017 to Non Final Office Action dated Mar. 8, 2017", 16 pgs.
"Chinese Application Serial No. 201480080251.3, Amendment filed Apr. 10, 2017", w/English Translation, 2 pgs.
"International Application Serial No. PCT/RU2014/000568, International Search Report dated May 4, 2015", 3 pgs.
"International Application Serial No. PCT/RU2014/000568, Written Opinion dated May 4, 2015", 8 pgs.

* cited by examiner

SECTOR LEVEL SWEEP FOR MILLIMETER-WAVE MULTIPLE OUTPUT COMMUNICATIONS

PRIORITY CLAIM

This application claims the benefit of priority under 35 USC 119(e) to U.S. Provisional Patent Application Ser. No. 62/217,242, filed Sep. 11, 2015, which is incorporated herein by reference in its entirety and also claims the benefit of priority under 35 USC 119(e) to U.S. Provisional Patent Application Ser. No. 62/218,602, filed Sep. 15, 2015, which is also incorporated herein by reference in its entirety.

TECHNICAL FIELD

Examples generally relate to systems and methods for beamforming training. Some examples regard systems and methods for Single User (SU) or Multiple User (MU) Multiple Input Multiple Output (MIMO) or Single Input Multiple Output (SIMO) training of one or more devices. One or more examples relate to the Institute of Electrical and Electronics Engineers (IEEE) 802.11 family of standards including the IEEE 802.11ay millimeter wave (60 GHz) proposed standard, among other standards.

BACKGROUND

The IEEE 802.11ay task group has begun development of a new standard related to the millimeter wave (mmWave) (i.e. 60 gigaHertz (GHz)) standard. This standard is an evolution of the IEEE 802.11ad standard (sometimes referred to as "WiGig"). The IEEE 802.11ay task group has proposed a variety of new use cases to be supported in a future standard. One such use case includes a "hot spot" (small cell) scenario with multiple users associated to a small cell access point (AP). Another use case includes a personal basis service set (PBSS) control point (CP) (PCP) which can be equipped with a large aperture antenna array or a modular antenna array (MAA) and associated with multiple users.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
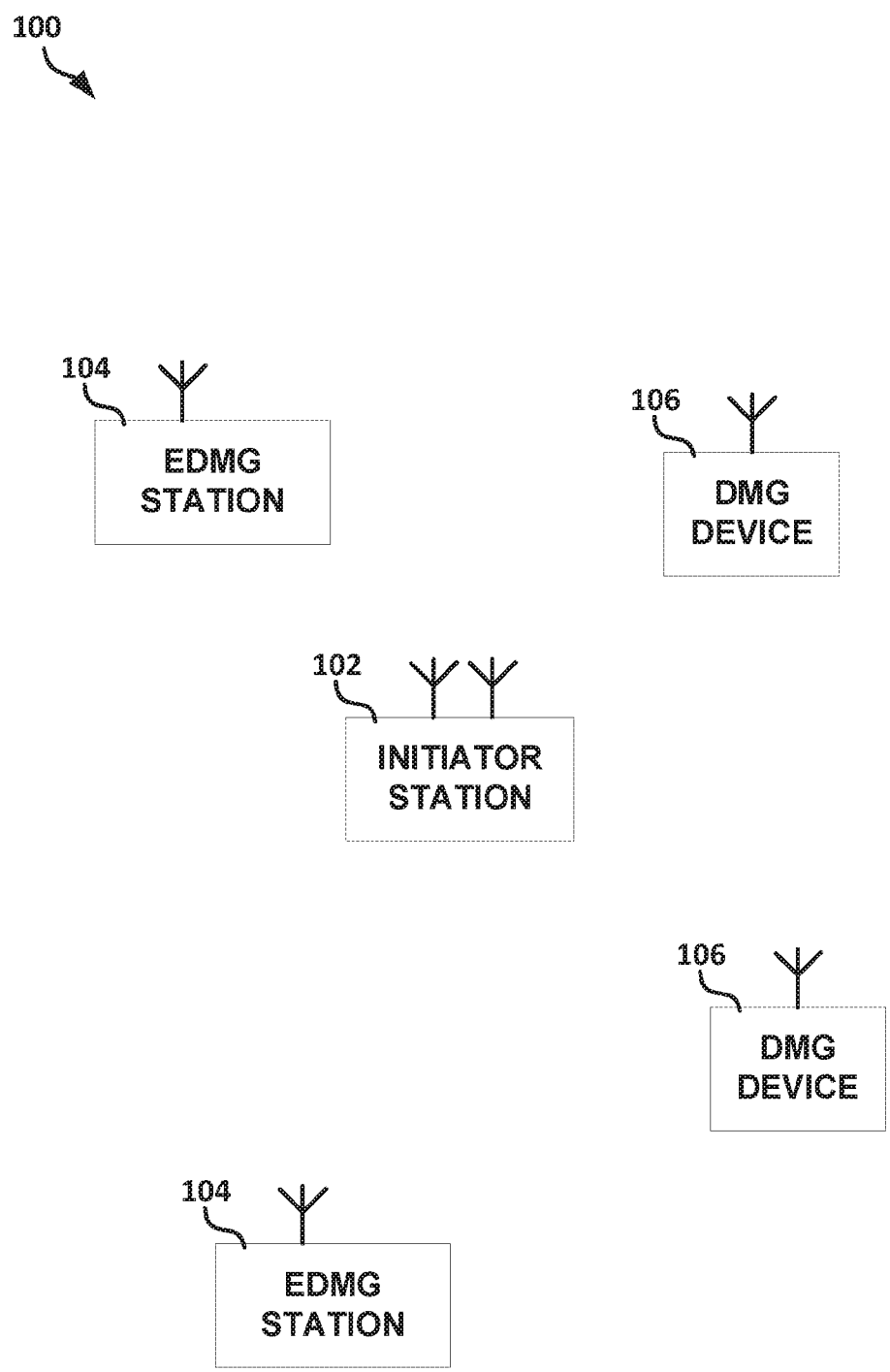
FIG. 1 illustrates, by way of example, a block diagram of a WLAN including a basic service set (BSS) in accord with one or more embodiments.

Examples in this disclosure relate generally to systems and methods for beamforming training. Some examples regard systems and methods for Multiple User (MU) Multiple Input Multiple Output (MU-MIMO) training of a group of devices and other examples regard systems and methods for Single User MIMO (SU-MIMO), SU single input multiple output (SU-SIMO), or SU single input single output (SU-SISO). One or more examples relate to the Institute of Electrical and Electronics Engineers (IEEE) 802.11 family of standards including the IEEE 802.11ay millimeter wave (60 GHz) proposed standard, among other standards.

MIMO transmission modes are discussed herein. In MU-MIMO mode an AP/PCP provides access for multiple user devices and the multiple user devices can communicate simultaneously, such as in the same time slot and frequency slot. Such simultaneous communication exploits space separation and directivity properties of one or more AP antennas. Note that AP, as used herein can include a PCP (PBSS CP). The MU-MIMO transmission mode can include a beamforming training (BT) protocol to determine which sector a given station (STA) will be used in communicating with the AP/PCP and which sector of the AP/PCP will be used in communicating with the STA.

Discussed herein is a sector level sweep (SLS) beamforming protocol for simultaneous training of devices (or antennas in the SU case), such as by using MU-MIMO, SU-MIMO, SU-MISO, SU-SIMO, or SU-SISO. The protocol, such as can be combined with multi-user scheduling, can help increase throughput, reduce time, and/or reduce power consumption.

The SLS beamforming protocols discussed herein consider the number of user devices (e.g., STAs or legacy devices) requesting access to the AP. The beamforming protocol provides simultaneous transmit and receive training for the multiple user devices. The transmit and/or receive training can be simultaneous in time and in the same frequency band. In one or more embodiments, the AP can perform beamforming training with legacy STAs that support directional multi-gigabit (DMG) physical layer (PHY) defined in the IEEE 802.11ad standard and/or new devices with enhanced DMG (EDMG) PHY as can be defined in the future IEEE 802.11ay.

The SLS protocols discussed herein include two phases. In the first phase, an AP performs an SLS indicating, to the STAs, the frames that can be used for the simultaneous beamforming training (BT). Legacy IEEE 802.11ad STAs supporting DMG PHY can receive and decode these frames. However, these legacy STAs discard these frames since legacy STAs cannot decode an EDMG header field that indicates that the frame is an enhanced SLS (ESLS) frame. Other STAs, such as IEEE 802.11ay STAs, can decode the frame and use the frame for BT. The training of the legacy STAs can be done separately using a legacy beamforming protocol defined in the IEEE 802.11 ad standard.

In the second phase, the AP can listen to media and receive a feedback frame (e.g., SSW-FB frame) from respective EDMG STAs that decide to respond to the AP. The AP can send acknowledgments (SSW-ACKs) to the STAs, such as to confirm completion of the BT. In the feedback frames, the STAs can provide information regarding their beamforming settings (e.g., optimal beamforming settings), which can be used by the AP for space-time scheduling and used by the AP in transmitting to the STA.

The BT can be accomplished using training units, such as can be appended to a sector sweep (SSW) frame defined in the IEEE 802.11ad standard, such as an SSW frame or an SSW-FB frame. The BT can further include the STAs responding to the AP by providing beamforming settings, such as can be only in the best sector of the AP selected during phase one. Thus, the BT protocol can be efficient even with a large number of users connecting (e.g., concurrently) to the same AP.

FIG. 1 illustrates a WLAN 100 in accord with some embodiments. The WLAN 100 may comprise a basic service set (BSS) or personal BSS (PBSS) that may include an initiator STA 102, which may be an AP or PBSS control point (PCP), a plurality of wireless (e.g., IEEE 802.11ay) enhanced directional multi-gigabit (EDMG) STAs 104 and a plurality of (e.g., IEEE 802.11n/ac/ad) directional multi-gigabit (DMG) devices 106. Note that an EDMG STA 104 and a DMG STA 106 can both be responder STAs, with the EDMG STA 104 capable of implementing protocols discussed herein. The DMG STA 106 is sometimes referred to as a legacy device, while the EDMG STA 104 is sometimes referred to as a responder STA. This is merely for convenience in the discussion that follows with the understanding that STAs 104 and 106 can be responder STAs.

The initiator STA 102 may be an AP using the IEEE 802.11 to transmit and receive. The initiator STA 102 may be a base station. The initiator STA 102 may be a PBSS. The initiator STA 102 may use other communications protocols as well as the IEEE 802.11 protocol. The IEEE 802.11 protocol may be IEEE 802.11ay. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA), multiple-input multiple-output (MIMO), multi-user MIMO (MU-MIMO), and/or single-input single-output (SISO). The initiator STA 102 and/or wireless responder STA 104 may be configured to operate in accordance with NG60, WiGiG, and/or IEEE 802.11ay.

The legacy devices 106 may operate in accord with one or more of IEEE 802.11 a/b/g/n/ac/ad/af/ah/aj, or another legacy wireless communication standard. The legacy devices 106 may be STAs (e.g., IEEE STAs).

The wireless responder STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay or another wireless protocol. The responder STAs 104 and/or initiator STA 102 may be attached to a BSS and may also operate using IEEE 802.11ay where one of the responder STAs 104 and/or initiator STA 102 takes the role of the AP, PCP, or PBSS.

The responder STAs 104 are devices that have the capability to implement the 802.11 standard from the Institute of Electrical and Electronics Engineers (IEEE) association. The responder STA 104 can be a phone, such as a Wi-Fi enabled phone, a laptop, tablet, desktop computer, set top box, car computer, or a personal digital assistant (PDA), among other devices capable of implementing the 802.11 standard. An STA is sometimes referred to as a wireless device or a node. Formally, an STA as defined in the 802.11 standard is any device that contains an IEEE 802.11-conformant media access control (MAC) and physical layer (PHY) interface to a wireless medium (WM). In one or more embodiments, the responder STAs 104 are devices, such as is discussed with regard to device 1300 of FIG. 13.

The initiator STA 102 may communicate with legacy devices 106 in accord with legacy IEEE 802.11 communication techniques. In example embodiments, the initiator STA 102 may also be configured to communicate with wireless responder STAs 104 in accord with legacy IEEE 802.11 communication techniques. The initiator STA 102 may use techniques of 802.11ad for communication with legacy device 106. The initiator STA 102 may be a personal basic service set (PBSS) Control Point (PCP) which can be equipped with large aperture antenna array, phased antenna array (PAA), or a Modular Antenna Array (MAA).

The initiator STA 102 may be equipped with more than one antenna. Each of the antennas of initiator STA 102 may be a phased array antenna with many elements. In some embodiments, an IEEE 802.11ay frame may be configurable to have the same bandwidth as a channel. The frame may be configured to operate over one to four 2160 MHz channels. The channels may be contiguous in frequency spectrum.

An 802.11ay frame may be configured for transmitting a number of spatial streams, which may be in accordance with MU-MIMO. In other embodiments, the initiator STA 102, wireless responder STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to 802.11ay communications. In accord with some IEEE 802.11ay embodiments, an initiator STA 102 may operate as a master STA which may be arranged to contend for a wireless medium (e.g., during a contention period) to receive exclusive control of the medium for performing enhanced beamforming training for a multiple access technique such as OFDMA or MU-MIMO. In some embodiments, the multiple-access technique used during the TxOP (transmit opportunity) may be a scheduled OFDMA technique, although this is not a requirement. In some embodiments, the multiple access technique may be a space-division multiple access (SDMA) technique.

In example embodiments, the station 104, the initiator STA 102, and/or the legacy devices 106 are configured to perform the methods and functions herein described in conjunction with FIGS. 1-11.

Figures 2A, 2B:
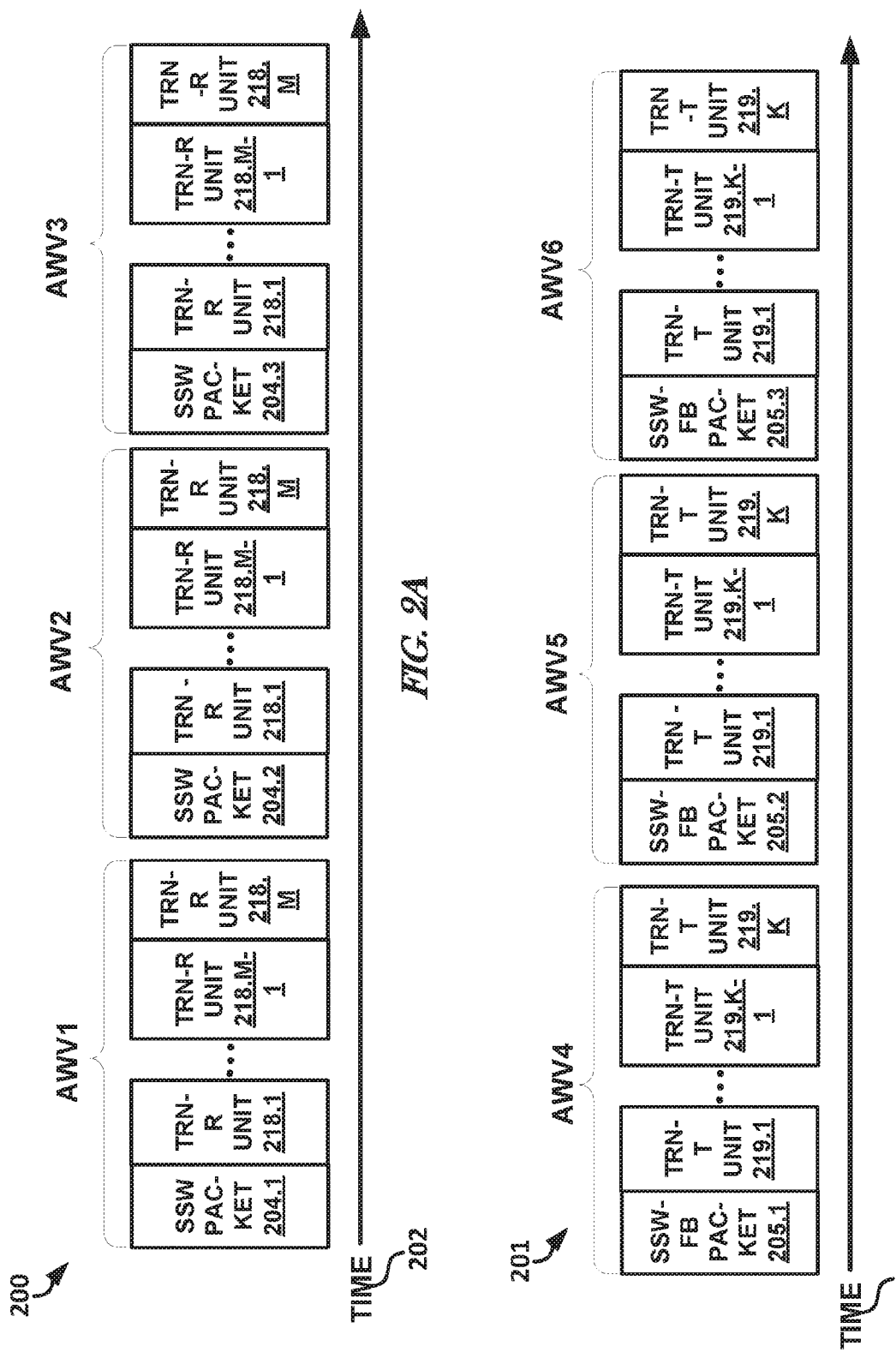
FIG. 2A illustrates an enhanced SSW packet in accord with one or more embodiments.
FIG. 2B illustrates an enhanced SSW-FB packet in accord with one or more embodiments.

FIG. 2A illustrates an enhanced SSW (ESSW) packet 200 in accord with one or more embodiments. Illustrated in FIG. 2A is time 202 along a horizontal axis, a legacy SSW packet 204, and training units (TRN-R Units) 218. The SSW packet 204 can include an SSW packet as defined in the IEEE 802.11ad standard. The SSW packet 204 can include repetitions of Golay sequences. In one or more embodiments, the SSW packet 204 includes a header field indicating that the packet is enhanced and is not for legacy device decoding. The training units 218 can include a number of transmitter training (TRN-T) sequences. The SSW packet 204 can include one or more association identifications (AIDS).

The AIDS may indicate which responder STAs 104 the ESSW packet 200 is for. The AIDS may indicate an order for the responder STA 104 to respond to the ESSW packet 200. The AIDS may indicate which responder STAs 104 are to be trained with the TRN-R Units 218. Responder STAs 104 may be configured to stop reception of the ESSW packet 200 if they determine their AID is not one of the AIDS of the ESSW packet 200.

The ESSW packet 200 may be transmitted using one or more Antenna Weight Vectors (AWVs) (indicated by AWV1, AWV2, AWV3 in FIG. 2A). The antennas weight vectors are applied to one or more antennas of the transmitting device. In omni-directional transmission, one antenna is used, while in directional transmission, multiple antennas (e.g., a phased antenna array (PAA)) are used. The number of ESSW packets 200 may be based on the number of different antenna (or antenna combinations) used (i.e. AWVs). For example, as illustrated there are three different packets, one for each AWV (AWV1, AWV2, and AWV3). This enables concurrent training of all the responder STAs.

The ESSW packet 200 can include TRN-R fields, such as to train RX beamforming vectors, the maximum number of which is defined by the initiator STA 102. The responder STA 104 can respond with an SSW-FB frame 201 appended with TRN-T units 219 to perform TX beamforming training. The maximum number of TRN-T units from the responder STA 104 is defined by the responder STA 104. In the SSW-ACK frame (see FIGS. 5, 6, 9, 10, and 11) the initiator STA 102 provides a best sector ID based on training using the TRN-T units from the SSW-FB frame.

The SSW packet 204 may include an AWV setting per each of the TRN-R sequences for training antenna weight vector settings. The SSW packet 204 can optionally include an automatic gain control (AGC) field. TRN-R Units 218 are training fields used by the responder STA 104 to determine which sector provides the highest received signal strength (RSS), highest signal to noise ratio (SNR), or other indicator of signal quality. The initiator STA 102 may change the antenna weight vector before transmitting the packet 204.

The ESSW packet 200 may support single input single output (SISO), MIMO, MU-MIMO, SU-SISO, SU-MIMO, and MU-SISO. The ESSW packet 200 enables training several receiver streams at the same time. The ESSW packet 200 can be used to train one or more responder STAs 104. The ESSW packet 200 may be a control PHY packet. The ESSW packet 200 may be a single carrier (SC) PHY packet.

FIG. 2B illustrates an enhanced SSW-FB packet 201 in accord with one or more embodiments. Illustrated in FIG. 2B is time 202 along a horizontal axis, a legacy SSW-FB packet 205, and training units (TRN-T Units) 219. The SSW-FB packet 205 can include an SSW-FB packet as defined in the IEEE 802.11ad standard. The SSW-FB packet 205 can include repetitions of Golay sequences. In one or more embodiments, the SSW-FB packet 205 includes a header field indicating that the packet is enhanced and is not for legacy device decoding.).

The ESSW-FB packet 201 may be transmitted using one or more Antenna Weight Vectors (AWVs) (indicated by AWV4, AWV5, AWV6 in FIG. 2B). The AWVs are applied to one or more antennas of the transmitting device.

The number of ESSW-FB packets 201 may be based on the number of different AWVs used, such as defined in a responder STA codebook. For example, as illustrated there are three different packets, one for each AWV (AWV4, AWV5, and AWV6).

The ESSW packet 200 can include TRN-T fields, such as to train TX beamforming vectors. The initiator STA 102 can respond with an SSW-ACK frame. The maximum number of TRN-T units from the responder STA 104 is defined by the responder STA 104.

Figure 3:
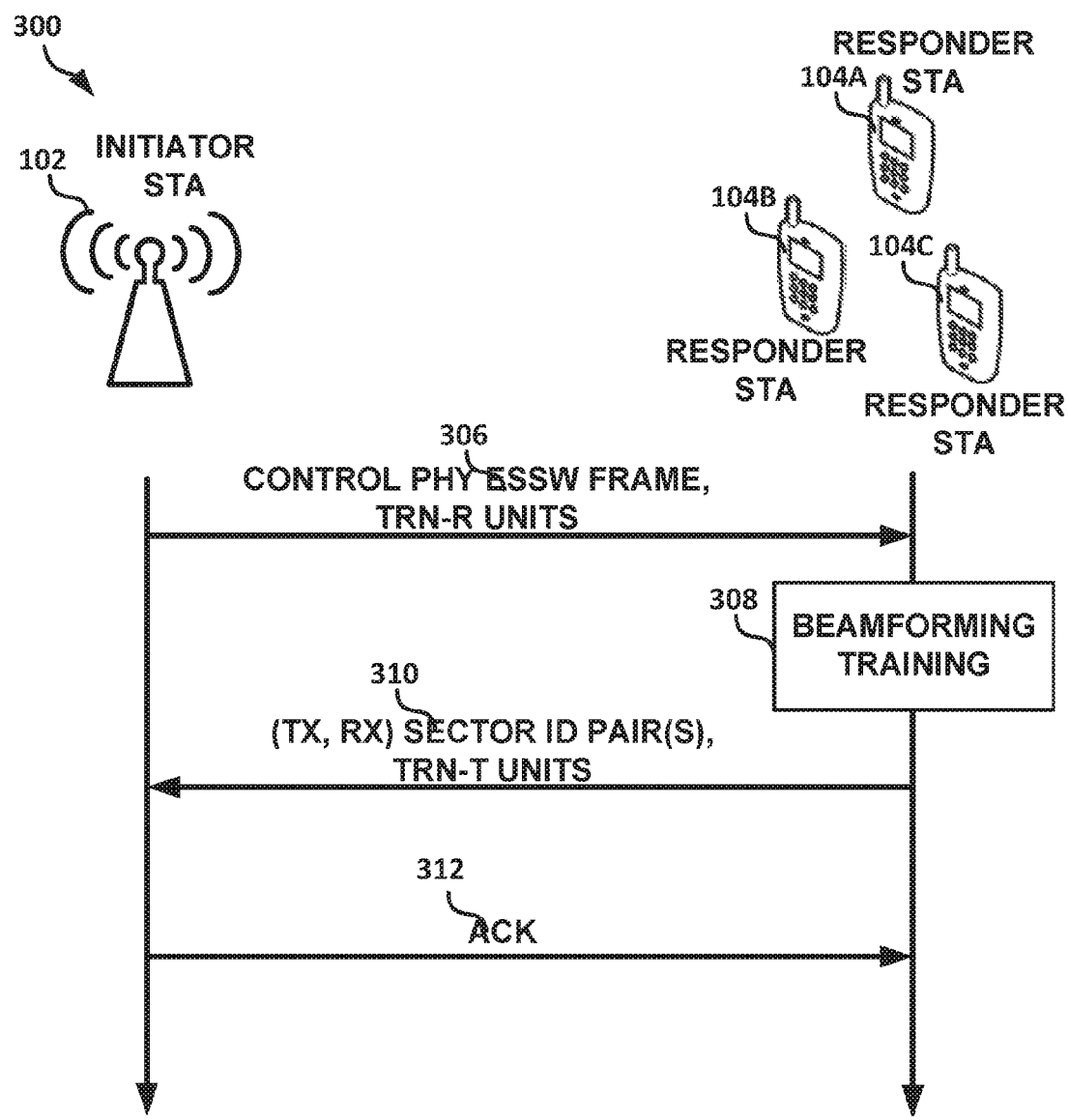
FIG. 3 illustrates, by way of example, a communication diagram of communications between an initiator STA and a plurality of STAs in accord with one or more embodiments.

FIG. 3 illustrates, by way of example, a communication diagram of a beamforming protocol 300 between an initiator STA 102 and a plurality of responder STAs 104A, 104B, and 104C in accord with one or more embodiments. Note that for an SU embodiment, the responder STAs 104A-C can be replaced with respective single antennas of a multiple antenna STA (see FIGS. 9-11). The communication diagram 300 is of an ESLS protocol. The protocol as illustrated includes two phases. The first phase is a sector level sweep (control PHY ESSW frame 306 and beamforming training 308). TRN-R fields are appended to the SSW frame(s) (see FIG. 2), such as can be used by the responder STAs 104A-C in BT 308. This phase is sometimes referred to as "broadcasting", since the control PHY ESSW frame(s) 306 are sent to all responder STAs 104A-C.

In this phase the initiator STA 102 performs a Transmit Sector Sweep (TXSS) by sending modified Control PHY SSW frames, each with different sector IDs (antenna weights) from 0 to N−1, where N is number of sectors from the initiator STA codebook. Each of the control PHY ESSW frame(s) 306 can include TRN field(s), such as can include Golay Ga/Gb sequences, or can include TRN-T or TRN-R training fields as defined in the IEEE 802.11ad standard.

Beamforming weights may be applied for the entire frame transmission. In one or more embodiments, the number of the TRN fields can be set to the maximum expected/allowed number of STA antenna elements, such as, 32 or other number. The responder STAs 104A-C receive the SSW frames in omni-regime (using a single receive antenna) or in the directional regime (using multiple (e.g., weighted) antennas), such as can be implementation specific. The responder STAs 104A-C perform BT 308, such as by using a TRN field for given initiating TA 102 TX sector ID.

In the BT 308, for each TX sector, the responder STA 104A-C can find its own best RX sector (or beamforming weight(s)) and select the best pair of sectors (TX, RX) among all possible combinations. In one or more embodiments, the responder STA 104A-C can also determine the pairs which provide sufficient beamforming gain for transmission (with slight degradation) compared to the best pair of sectors. BT 308 generally includes determining a received signal strength (RSS) and/or a signal to noise ratio (SNR) of a signal from the initiator STA 102. The highest RSS and/or highest SNR correspond to a best sector for the STA 102.

Several pairs determined to be sufficient for communication can be saved by the responder STA 104A-C and reported to the initiator STA 102 in phase 2, such as at the (TX, RX) sector ID pair(s) 310. These pairs of reported sectors may be used in a scheduling procedure. Using the first phase, all EDMG STAs (e.g., the responder STAs 104A-C) perform BT simultaneously in time using common TRN-T units sent by the initiator STA 102.

Different STAs can use the TRN field in different ways and can have different codebooks (the maximum size is defined by the codebook of the responder STA 104 or the initiator STA 102). Such a configuration allows for flexible receive beamforming and/or BT. Legacy devices, such as DMG STAs or other non-EDMG device, can discard the frame(s) 306 after decoding one or more of the fields of the frame and determining that the packet regards EDMG, such as ESLS.

In phase 2, the initiator STA 102 collects feedback from the responder STAs 104A-C, such as in the form of the (TX, RX) sector ID pair(s) 310 and provide an acknowledgement or respective acknowledgments to the responder STAs 104A-C, such as at the ACK 312.

In phase 2, the initiator STA 102 (and the responder STAs 104A-C) perform Receive Sector Sweep (RXSS), such as can include using the same order of the sectors as in phase 1. STAs send the Sector Sweep Feedback (SSWFB) frames (e.g., the pair(s) 310), such as can include responding in only the best sector of the initiator STA 102 selected during phase 1. The SSW-FB frames can include TRN-R units appended thereto, such as to form ESSW-FB frames.

Each responder STA 104A-C can provide data indicating one or more (TX, RX) sector pairs 310 to be used in a scheduling process. The (TX, RX) sector pairs can include one or more TRN-T units appended thereto. Each responder STA 104A-C can know the responding time, because it can be specified in the SSW frame 306 for each sector of the initiator STA 102. The responder STA 104A-C can count down from the time of the reception in the best initiator STA sector.

Each responder STA 104A-C can transmit using the best sector found during TRN-R training and therefore use reciprocity property of the TX/RX chains. Then initiator STA 102 can provide the acknowledgements (ACK(s) 312) using standard SSW-ACK frames 312, such defined in the IEEE 802.11ad standard. The initiator STA 102 can send the SSW-ACK 312 for each responder STA 104A-C only in the direction of the corresponding TX sector ID selected by the responder STA 104A-C in the (TX, RX) sector ID pair(s) 310. The TX sector ID can be selected based on the TRN-T units provided in the SSW-FB frame (i.e. 310).

Two or more STAs can choose the same sector of the initiator STA 102 and respond in the same sector. This leads to collision of the frames sent by the two or more STAs. A collision can be resolved by retrying the procedure (e.g., repeating the operations described with regard to the communication diagram 300) or the initiator STA 102 can send an SSW-ACK 312 to the two or more STAs "stacked" (using different carrier frequencies or different polarizations) in one sector with a special instruction on how this collision can be avoided. Another possibility to resolve the collision includes the initiator STA refraining from sending an ACK 312 to one or more of the two or more STAs that collided. The responder STA 104A-C that has not received an SSW-ACK 312 will wait for a future execution of the operations in the communication diagram 300. The responder STAs 104A-C remain in a receive mode with the best RX sector to obtain one or more SSW-ACKs 312 from the initiator STA 102 in the future. After successful beamforming, the initiator STA 102 and the responder STAs 104A-C can begin a transmission session or initiate a beam refinement protocol (BRP), for example.

Figure 4:
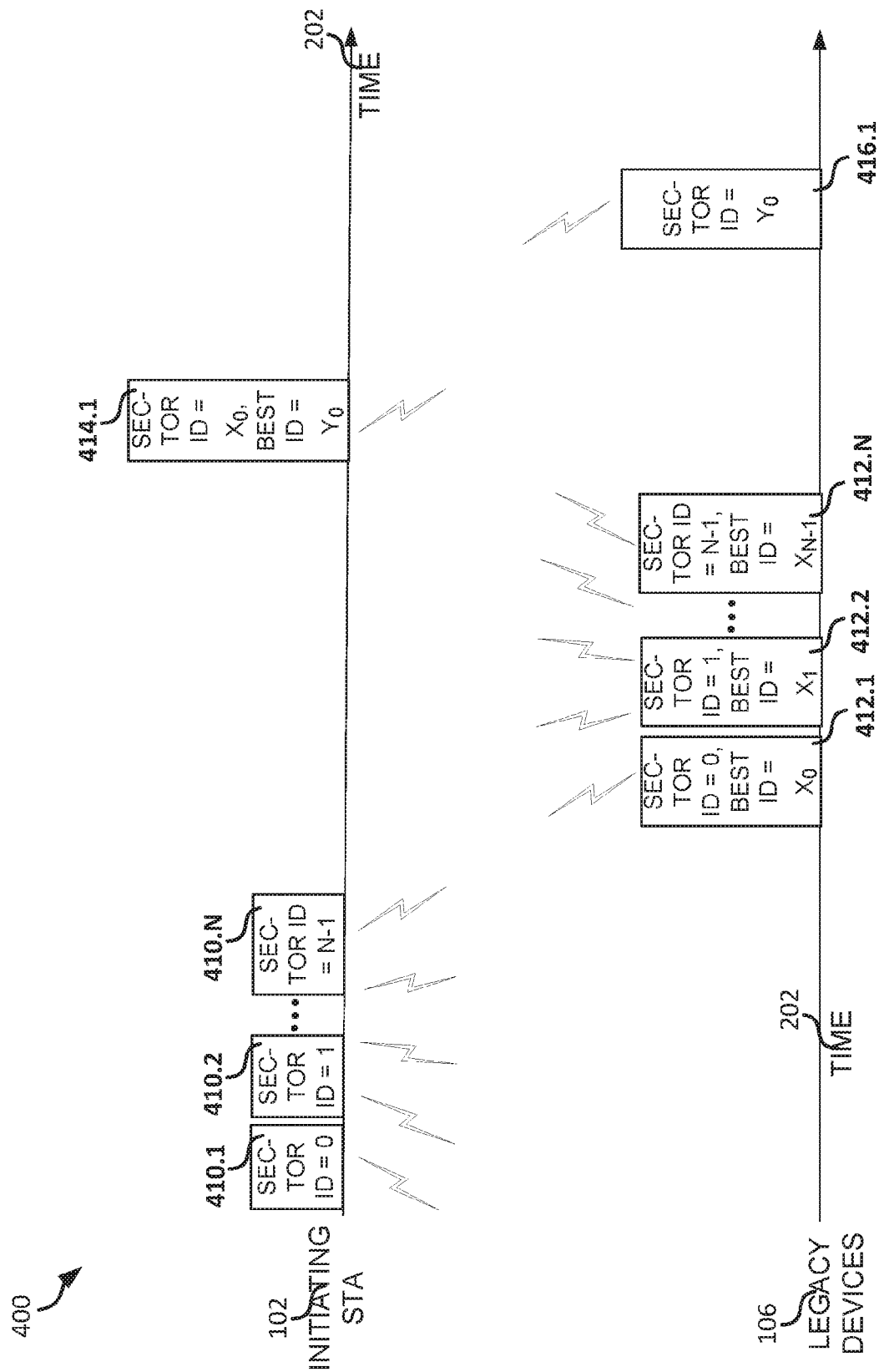
FIG. 4 illustrates a block diagram of an IEEE 802.11ad SLS beamforming protocol for two or more legacy devices.

FIG. 4 illustrates a block diagram of an IEEE 802.11ad SLS beamforming protocol 400 for two or more legacy devices 106. All transmissions of the protocol 400 can be performed using Control PHY, such as is defined in the IEEE 802.11ad standard. The protocol 400 as illustrated includes four phases: (1) SLS for initiator STA 102, (2) SLS for legacy device 106, (3) SSW-FB, and (4) SSW-ACK. The protocol 400 can be extended to include multiple legacy devices 106 by repeating phases 2-4 for another legacy device.

In the protocol 400, the initiator STA 102 performs a transmit sector sweep (TXSS) sending SSW frames 410 (e.g., 410.1, 410.2, 410.N, etc.) to the legacy devices 106. In this transmission the initiator STA 102 uses directional transmission, and the legacy device 106 uses omni reception (a single antenna) or quasi-omni reception (use all elements of the array and create omni signals).

In the protocol 400 the legacy devices 106 perform TXSS sending SSW frames 412 (e.g., 412.1, 412.2, 412.N, etc.) to the initiator STA 102. The legacy devices 106 can use directional transmission in sending and the initiator STA 102 can use omni-reception in receiving the frames 412. Each of the frames 412 sent by the legacy devices 106 can include information indicating the best sector ID selected during the SSW initiated by the initiator STA 102.

The initiator STA 102 provides an SSW feedback (SSW-FB) frame 414 (e.g., 414.1, 414.2, 414.N, etc.) using sector ID=$X_N$ that was indicated in the frame 412 as being the best for the legacy device 106. The legacy device 106 receives the SSW-FB frame 414 using omni-reception. The SSW-FB frames 414 include information indicating the best sector ID ($Y_N$) selected during the responder sector sweep (time the packets 412 were transmitted). The legacy devices 106 respond with an ACK frame 416 (e.g., 416.1, 416.2, 416.N, etc.). The ACK frame 416 can be provided using a directional transmission to the sector corresponding to the best ID in the SSW-FB frame 414. The ACK frame 416 can be received by the initiator STA 102 using omni-reception.

The sector IDs provided in the frame 410 are defined in a codebook (a memory) of the initiator STA 102. The sector IDs provided in the frame 412 are defined in a codebook of the legacy device 106. The best sector ID is best in terms of a heuristic performed by the legacy device 106 or the initiator STA 102. The best received signal strength (RSS) can be used as the heuristic. The RSS from each of the sectors in the omni or quasi-omni-directional transmission from the initiator STA 102 providing frames 410 can be compared to determine the best sector ID $X_N$. The RSS from each of the sectors in the omni-directional transmission from the legacy devices 106 providing frames 412 can be compared to determine the best sector ID $Y_N$. Where N is an integer indicating the number of sectors (e.g., possible weights defined in the codebook) of the initiator STA 102. In one or more embodiments, the RSS can be used in combination with signal to noise ratio (SNR) in determining which sector is the best. The PHY layer of the device (e.g., the initiator STA 102, responder STA 104, and/or legacy device 106) can report these measures to a corresponding MAC layer of the device.

After successful SLS, the legacy devices 106 can apply directional transmitter and receiver settings and switch to a directional transmission mode. The legacy devices 106 can perform a receiver sector sweep (RXSS) or beam refinement protocol (BRP) after the protocol 400.

Figure 5:
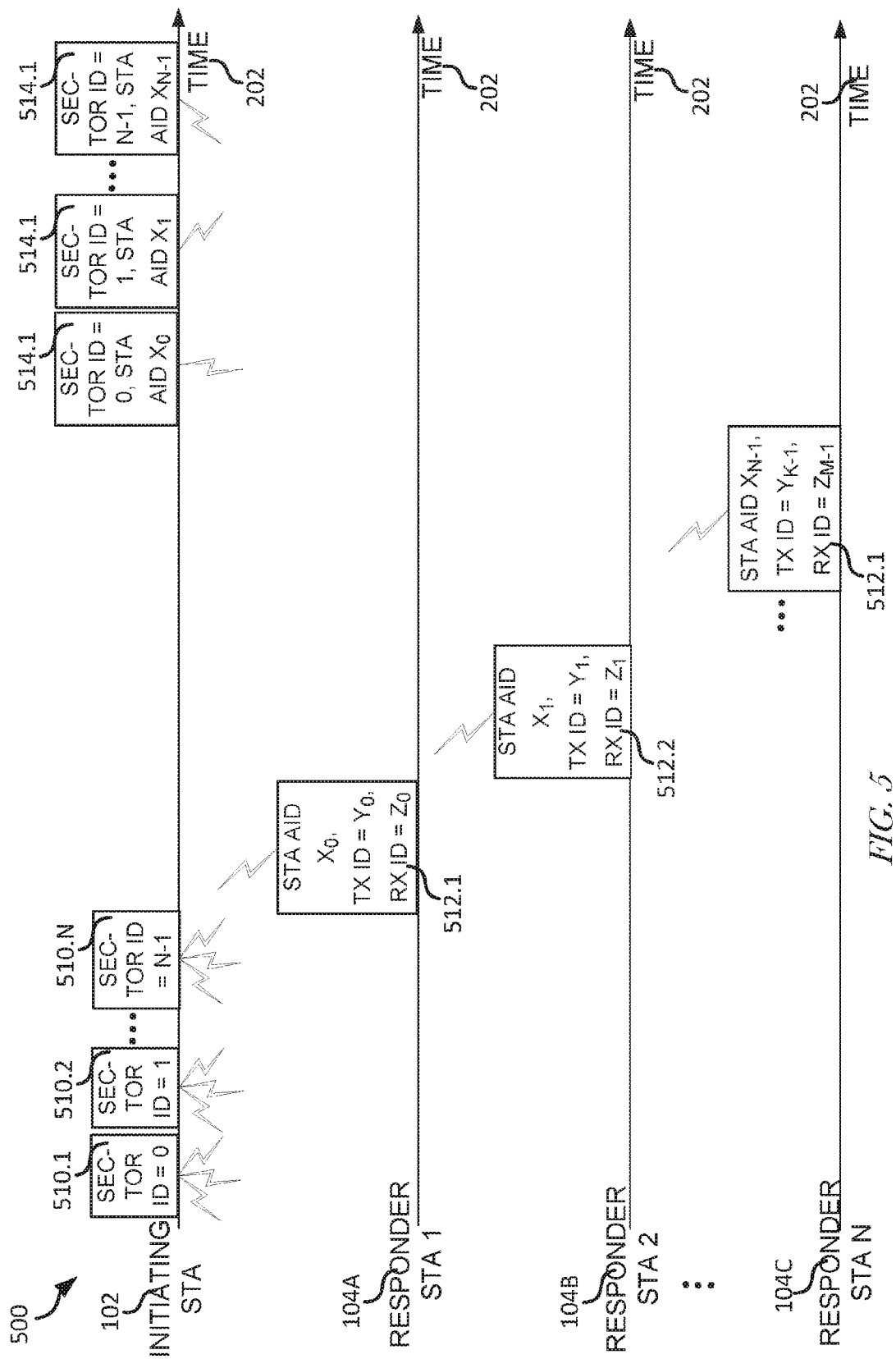
FIG. 5 illustrates a diagram of MU-MIMO ESLS beamforming protocol for two or more STAs in accord with one or more embodiments.

FIG. 5 illustrates a diagram of MU-MIMO ESLS beamforming protocol 500 for two or more responder STAs 104A-C in accord with one or more embodiments. The responder STAs 104A-C can be EDMG STAs. The protocol 500 illustrates an embodiment of the ESLS beamforming protocol of FIG. 3. In the protocol 500, the responder STAs 104A-C receive SSW-ACK frames 514 (e.g., 514.1, 514.2, 514.N, etc.) sequentially in time. Thus, SSW-FB frames 512 (e.g., 512.1, 512.2, 512.N, etc.) are not "interlaced" in time with the SSW-ACK frames 514. See FIG. 6 for an embodiment that includes the frames 512 and 514 interlaced in time.

The protocol 500 includes the initiator STA 102 providing omni-directional or directional transmission(s) with packets 510 (e.g., 510.1, 510.2, 510.N, etc.) that each include information that indicates a different sector ID. The responder STAs 104C receive the packets 510 in omni-directional or directional mode. The responder STAs 104A-C can provide SSW-FB frames 512 to the initiator STA 102. Each of the SSW-FB frames 512 can include data indicating the STA association identity (AID), a transmit ID (TX ID) $Y_K$ associated with a best transmit sector of the initiator STA 102 and a receive ID (RX ID) $Z_M$ indicating a best receive sector for the responder STA 104A-C. The SSW-FB frames 512 set up the receive beamforming. The SSW-FB frames 512 can be provided to the initiator STA 102 in a directional transmission, such as in a direction corresponding to the TX ID of the frame 512. The initiator STA 102 provides an SSW-ACK frame 514 that sets up the transmit beamforming. The SSW-ACK frame 514 can be provided in a directional transmission in the sector corresponding to $Y_K$ as indicated in the SSW-FB frame 512. The SSW-ACK frame 514 can include data indicating a sector ID and an STA AID, $X_N$, associated with the transmit beamforming frame, the SSW-ACK frame 512. The SSW-ACK frame 514 can be received by the responder STA 104A-C in a directional mode.

Figure 6:
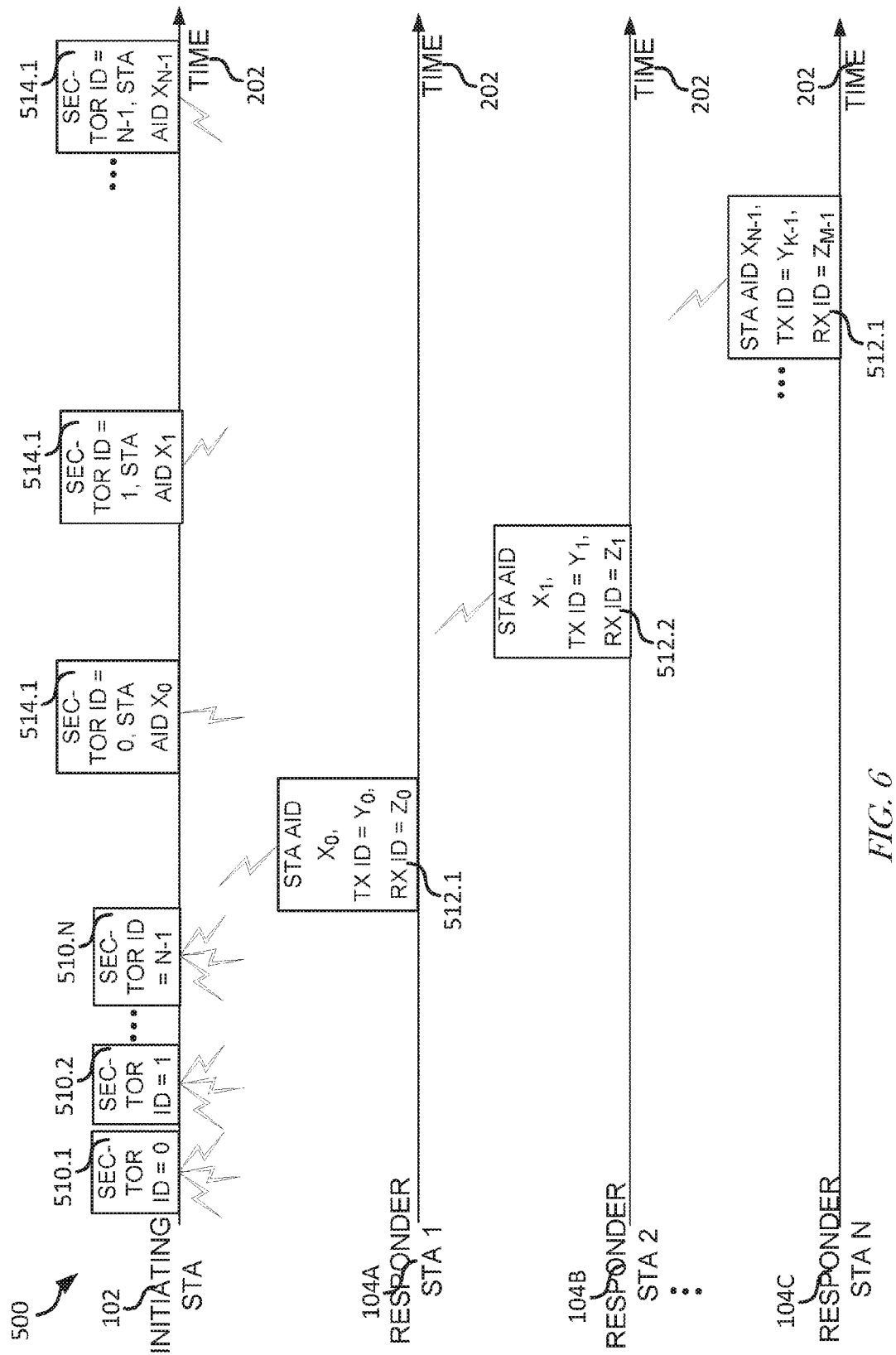
FIG. 6 illustrates a block diagram of an ESLS beamforming protocol for two or more STAs in accord with one or more embodiments.

FIG. 6 illustrates a block diagram of an ESLS beamforming protocol 600 for two or more responder STAs 104A-C in accord with one or more embodiments. The responder STAs 104A-C can be EDMG STAs. The protocol 600 illustrates an embodiment of the ESLS beamforming protocol of FIG. 3. The protocol 600 is similar to the protocol 500 with the protocol 600 including SSW-FB frames 512 and the SSW-ACK frames 514 interlaced in time rather than independently sequential in time as shown in FIG. 5. Thus, the initiator STA 102 provides the SSW-ACK frame 514.1 after receiving the SSW-FB frame 512.1 and before receiving the SSW-FB frame 512.2. In contrast, in the protocol 500 the SSW-FB frames 512 are all provided to the initiator STA 102 before the initiator STA 102 provides any of the SSW-ACK frames 514 (i.e. the SSW-FB frames 512 and SSW-ACK frames 514 are provided independently sequential in time in the protocol 500).

Figure 7:
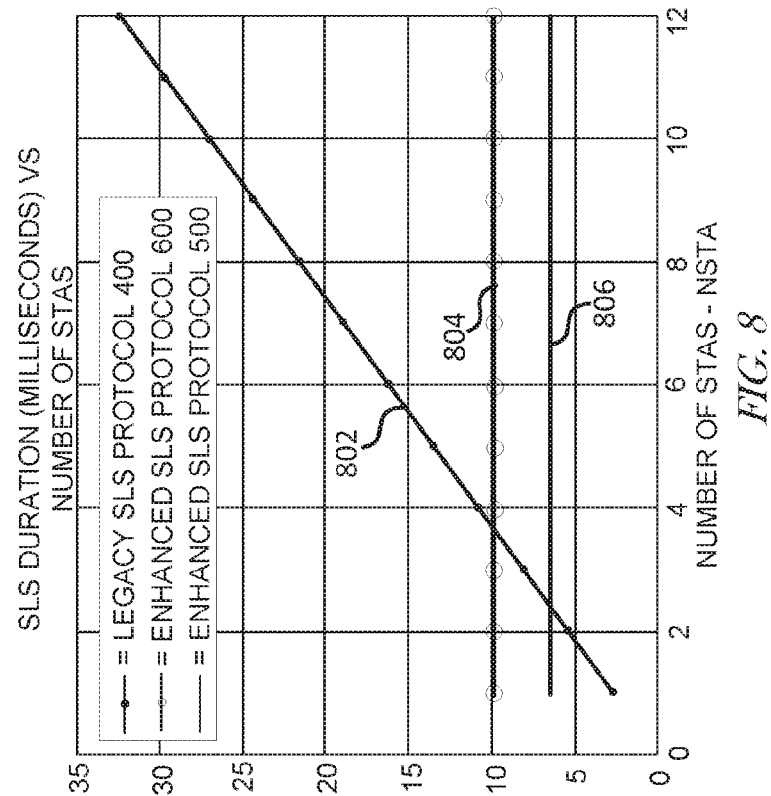
FIG. 7 illustrates, by way of example, a graph of SLS duration in milliseconds (y-axis) vs number of STAs (x-axis) for each of the protocols of FIGS. 4, 5, and 6.

FIG. 7 illustrates, by way of example, a graph 700 of SLS duration in milliseconds (y-axis) vs number of STAs (x-axis) for each of the protocols 400, 500, and 600. Line 702 corresponds to the protocol 400, line 704 corresponds to the protocol 600, and line 706 corresponds to the protocol 500.

The SLS duration for the protocol 400 (line 702) can be determined using Equation 1:

$$T_{SLS}=(N+M)*T_{SSW}+(N+M+2)*T_{SBIFS}+T_{SSW\text{-}FB}+T_{SSW\text{-}ACK}+3*T_{MBIFS}$$

Where N is the number of sectors for the initiator STA 102, M is number of sectors for the legacy device 106, $T_{SSW}$ is the time duration of the SSW frames 410, $T_{SSW\text{-}F}$ is the time duration of the SSW-FB frame 412, $T_{SSW\text{-}ACK}$ is the time duration of the SSW-ACK frame 414, and $T_{SBIFS}$ and $T_{MBIFS}$ are inter-frame spaces between the frames 410, 412, and 414. The following TABLE 1 summarizes details used in performing the calculations to determine the line 702.

TABLE 1

| PARAMETERS OF LEGACY SLS DURATION CALCULATION | | | |
|---|---|---|---|
| | SSW | SSW-FB | SSW-ACK |
| NUM LDPC WORDS | 2 | 3 | 3 |
| NUM BITS FIRST WORD | 88 | 88 | 88 |
| NUM BITS MIDDLE WORD | 160 | 88 | 88 |
| NUM BITS LAST WORD | 160 | 88 | 88 |
| PAYLOAD (uSEC) | 5.963636364 | 9.309090909 | 9.309090909 |
| FRAME DURATION (uSEC) | 14.90909091 | 18.25454545 | 18.25454545 |
| TOTAL DURATION PER STA (uSEC) = 1079.690909 | | | |

Thus, the duration based on the parameters of TABLE 1 is about 1 millisecond per STA.

The SLS duration for the protocol 500 (line 706) can be determined using the following Equation 2:

$$T_{ESLS\_OPT1}=N*T_{ESSW}+(N_{STA}+N-2)*T_{SBIFS}+(N+1)*T_{MBIFS}+N*T_{SSW\text{-}FB}+N_{STA}*T_{SSW\text{-}ACK}$$

Where N is the number of sectors for the initiator STA 102, $T_{ESSW}$ is the time duration of the enhanced SSW frames 510 (see FIG. 2 for an ESSW frame 200), $T_{SSW\text{-}FB}$ is the time duration of the SSW-FB frame 512, $T_{SSW\text{-}ACK}$ is the time duration of the SSW-ACK frame 514, and $T_{SBIFS}$ and $T_{MBIFS}$ are inter-frame spaces between the frames 510, 512, and 514. Note that $T_{SSW\text{-}FB}$ and $T_{SSW\text{-}ACK}$ can be the same duration as in the legacy SLS of the protocol 400. The duration of the ESLS beamforming of the protocol depends on the number of responder STAs 104A-C. However, unlike the legacy protocol 400, the number of STAs only affects a few of the variables in the Equation 2, whereas the $T_{SLS}$ for the legacy protocol 400 is multiplied by the $N_{STAS}$ to determine the duration.

The SLS duration for the protocol 600 (line 704) can be determined using Equation 3:

$$T_{ESLS\_OPT2}=N*T_{ESSW}+(N-1)*T_{SBIFS}+2*N*T_{MBIFS}+N*T_{SSW\text{-}FB}+N*T_{SSW\text{-}ACK}$$

As can be seen in Equation 3, the duration of the ESLS beamforming protocol 600 does not depend on the number of STAs ($N_{STAS}$). The ESSW frame (i.e. frames 510 and 610) are composed of the legacy SSW frame appended with legacy or enhanced TRN units (see FIG. 2). The length of the enhanced TRN unit can be variable. For example, if the TRN unit is four Golay sequences of length 128 samples and the number of sectors for the responder STA 104A-C is M=32, the duration of the ESSW frame is increased by about 9.3 microseconds over the duration of the legacy SSW frame.

TABLE 2 shows some parameters that were used in performing the calculation of the lines 704 and 706.

|  | ENHANCED SSW | SSW-FB | SSW-ACK |
|---|---|---|---|
| FRAME DURATION (uSEC) | 24.2182 | 18.25454545 | 18.25454545 |
| ESLS DURATION OPTION 1 = 1773.6 uSEC | | | |
| ESLS DURATION OPTION 2 = 2568.9 uSEC | | | |

Note that the protocol 600 has a slightly longer duration as compared to the protocol 500, but the protocol 600 does not require scheduling of SSW-BF response, which can lead to lower implementation complexity. Note that in the lines graphed in FIG. 7, N=M=32. As can be seen in FIG. 7, the protocol 500 has a smaller duration compared to the protocol 400 when including two or more STAs and the protocol 600 has a smaller duration compared to the protocol 400 when including three or more STAs.

Figure 8:
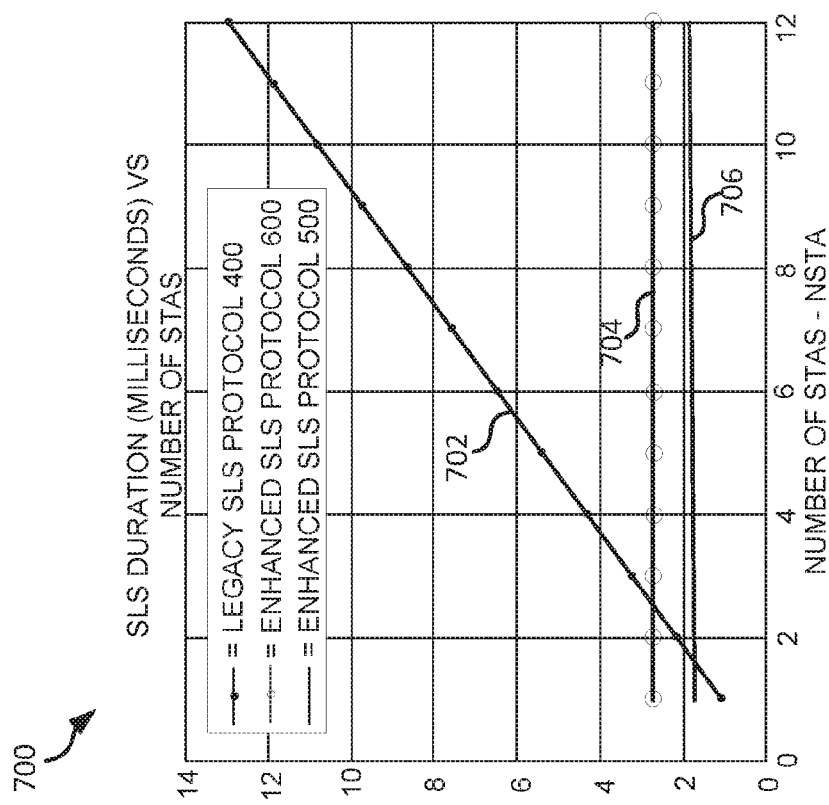
FIG. 8 illustrates, by way of example, another graph of SLS duration in milliseconds (y-axis) vs number of STAs (x-axis) for each of the protocols of FIGS. 4, 5, and 6.

FIG. 8 illustrates, by way of example, a graph 800 of SLS duration in milliseconds (y-axis) vs number of STAs (x-axis) for each of the protocols 400, 500, and 600. Line 802 corresponds to the protocol 400, line 804 corresponds to the protocol 600, and line 806 corresponds to the protocol 500. The calculations for the lines 802, 804, and 806 were performed using Equations 1, 2, and 3 and the parameters in TABLES 1 and 2, with N=128 and M=32. As can be seen in FIG. 8, the ESLS protocol 500 has a smaller duration compared to the protocol 400 when including three or more STAs and the ESLS protocol 600 has a smaller duration compared to the protocol 400 when including four or more STAs.

Single User Cases

The MU-MIMO embodiments discussed with regard to FIGS. 1, 3, 5, and 6, can be extended to SU-MIMO by (generally) replacing the multiple responder STAs 104 with multiple antennas of the same STA. For example in FIGS. 5 and 6 each of the responder STAs 104A-C can be replaced with STA antennas (or polarizations). Thus, in the first phase all antennas of the STA can be trained simultaneously using the enhanced TRNs appended to the SSW frame (combined the TRNs and the SSW frame are referred to as ESSW frame). In the second phase, the antennas of the STA respond to the initiator STA only in the best sector of the initiator STA selected during phase one. The response can include the beamforming settings that work best for the STA. Thus, the initiator STA antennas (or polarizations) are trained and the STAs antennas (or polarizations) are trained simultaneously. More detail on changes to the protocol to make it conform to SU embodiments are now discussed.

The proposed enhanced Sector Level Sweep (SLS) beamforming protocols for SU-MIMO considers a pair of STAs (e.g., an initiator STA 102 and a responder STA 104) and at least one of the STAs have SU capabilities. Basically, the proposed SU-MIMO SLS protocol is composed of two logical phases. In the first phase, initiator STA performs ESLS sending the frames which can be used for the simultaneous beamforming training of all antennas (or polarizations) of the responder STA. Note that all antennas (or polarizations) of the initiator STA are consequently trained. The initiator STA operates with sectors and in case, for example, of two antennas with N1 and N2 sectors, respectively, the initiator STA sweeps the sectors of the first antenna from sector 0 through N1−1 and the second antenna from sector 0 through N2−1.

In the second phase the initiator STA listens to the media and receives feedback frames from the responder STA. Then the initiator STA sends the acknowledgements to the responder STA antennas confirming successful completion of the beamforming training. In the feedback frames, the STA provides information about their preferred beamforming settings.

The protocol includes all antennas of the responder STA being trained simultaneously during phase one using enhanced training units, such as can be appended to the regular Sector Sweep (SSW) frame defined in the IEEE 802.11ad standard. In the second phase the antennas of the responder STA responds to the initiator STA providing the optimal beamforming settings only in the sector of the initiator STA selected during phase one. The initiator STA antennas (or polarizations) are consequently trained and the responder STA antennas (or polarizations) are trained simultaneously.

An advantage of the ESLS SU-MIMO protocols discussed can include: (1) The ESLS beamforming protocol guarantees that the beamforming duration for the STA connection to another STA grows very slowly with the number of antennas per STA. On the other hand, the beamforming duration using the legacy IEEE 802.11ad SLS protocol grows faster with the number of antennas per STA. (2) The ESLS protocol can use reciprocity of the receive/transmit mode which avoids using omni regime at any side. (3) The considered protocol can use frames with full backward compatibility to the 802.11ad standard and allows legacy DMG devices to decode them and discard based on the special fields of the header. (4) The SU-MIMO ESLS protocols can allow beamforming training of EDMG devices with different beamforming capabilities (antenna type, number of elements in phased antennas array, etc.). So, the STAs can use the appended enhanced training (TRN) units to the SSW frames in a different way.

Figure 9:
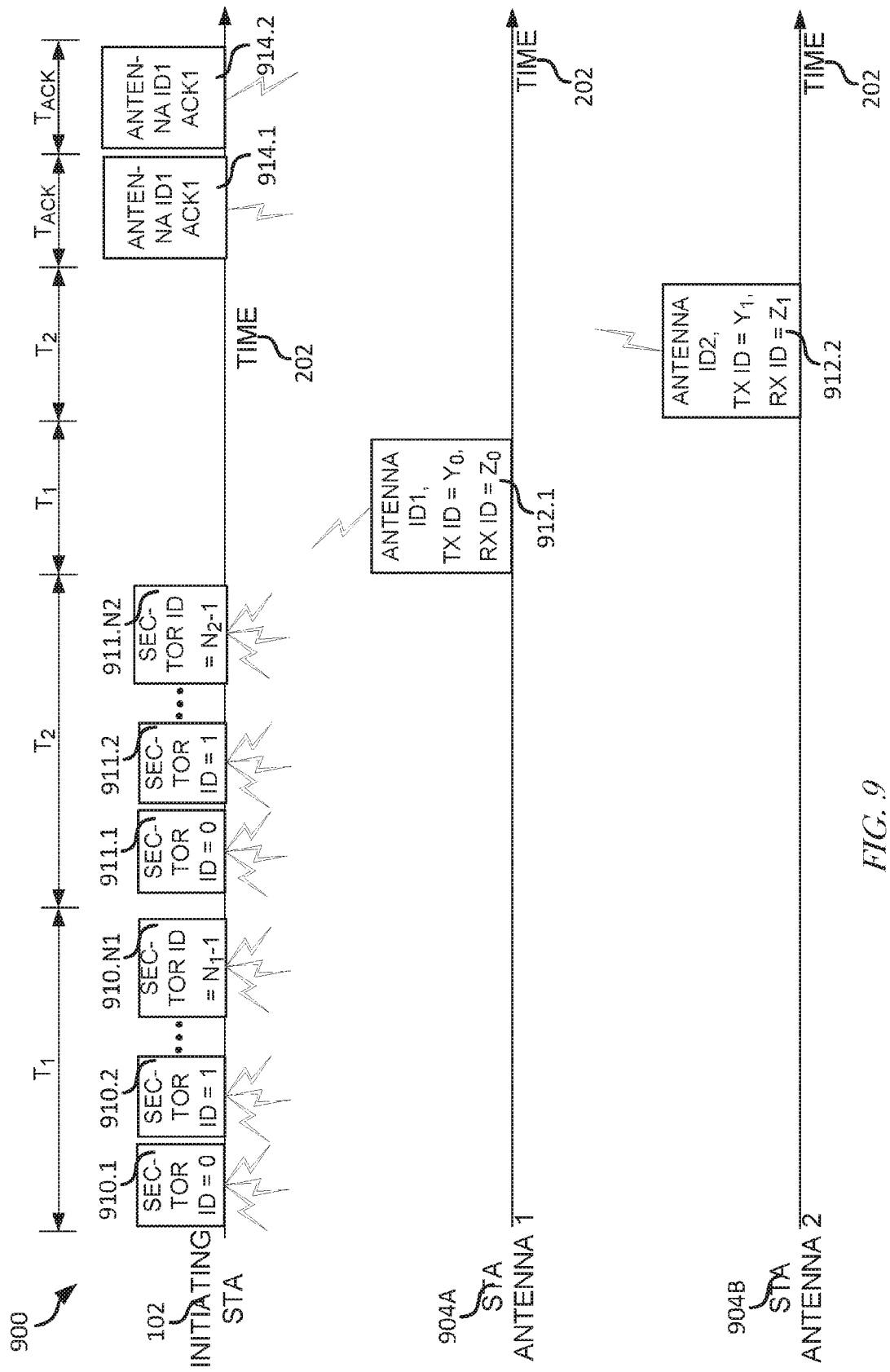
FIG. 9 illustrates, by way of example, a diagram of a SU-MIMO ESLS beamforming protocol for two or more STA antennas (or polarizations) in accord with one or more embodiments.

FIG. 9 illustrates, by way of example, a diagram of a SU-MIMO ESLS beamforming protocol 900 for two or more STA antennas or polarizations in accord with one or more embodiments. Phase 1 of the protocol 900 comprises TX beamforming (i.e. transmitting the packets 910 (e.g., 910.1, 910.2, 910.N1, etc.) and 911 (e.g., 911.1, 911.2, 911.N2)). Each of the packets 910 and 911 can include a sector ID (i.e. a sector weight). Each of the packets 910 and 911 can include a legacy Control PHY SSW frame appended with TRN units (see FIG. 2) to allow for antenna beamforming training. In one or more embodiments, the number of TRN units can be set to a maximum number or TRN units.

The packets 910 and 911 make up a transmit sector sweep (TXSS). The weights of the first antenna of the initiator STA 102 range from sector ID 0 to sector ID $N_1-1$ and the weights of the second antenna of the initiator STA 102 range from sector ID 0 to sector ID $N_2-1$.

Note that the term "antenna" as used with regard to SU-MIMO embodiments can be replaced with a polarization (e.g., a horizontal (H) polarization or vertical (V) polarization, or other polarization) without loss of generality. All antennas 904A-B of the responder EDMG responder STA 104 receive the modified SSW frames 910 and 911 in omni or directional regime (depending on the implementation) and perform RX beamforming training using TRN units for each initiator STA TX sector ID.

All antennas 904A-B of the responder EDMG STA perform TRN RX beamforming simultaneously in time using common TX frames sent by the initiator STA 102. Different STA antennas 904A-B can use TRN unit in a different way and can have different codebooks, such a configuration provides flexibility in RX beamforming. A legacy DMG STA that has only one antenna can do training of the single antenna using the packets 910 and/or 911.

Phase 2 of the protocol 900 comprises RX beamforming, such as can include providing feedback packets 912 (e.g., 912.1 and 912.2) and ACK packets 914 (e.g., 914.1, 914.2, etc.). Each of the packets 912 can include data indicating the antenna ID of the antenna 904A-B, a best TX ID indicating a sector of the initiator STA 102 that provides the best signal to the antenna 904AB, and a best RX ID indicating a sector of the STA antenna 904A-B that corresponds to the best received signal from the initiator STA 102. The packets 914 can include the antenna ID and some data indicating that the initiator STA successfully received the feedback packet 912 (i.e. an acknowledgment).

In one or more embodiments, the initiator STA 102 performs RXSS using the same order of the sectors as used in phase one. The responder STA 104 sends SSW-FB frames 912 from different antennas 904A-B responding in the initiator STA sector selected during phase one. The SSW-FB frame 912 provides the information of the best (TX, RX) sectors for the corresponding antenna 904A-B.

The following cases are possible: (1) Both STA antennas 904A-B are determined to have their best signal reception correspond to the same TX sector of the initiator STA 102. In such as case single input multiple output (SIMO) transmission is possible by switching off one of the TX antennas. In such a case, single input single output (SISO) transmission is possible by switching off one of each of the TX and RX antennas. In such a case, MIMO transmission is possible if the initiator STA 102 selects a suboptimal sector for the second antenna. (2) Both STA antennas 904A-B are determined to have their best signal reception from different sectors of the same initiator STA 102 antenna. In such a case, SIMO transmission is possible by switching off one of the TX antennas and selecting one the TX sectors of the selected antenna. In such a case SISO transmission is possible by switching off one of each of the TX antennas and RX antennas. In such a case, MIMO transmission is possible if the initiator STA 102 selects a suboptimal sector for its second antenna. (3) Both STA antennas 904A-B are determined to have their best signal reception correspond to the sectors of different initiator STA antennas 102. In such a case, MIMO transmission is possible with the responder STA 104 selected (TX, RX) sectors (as identified by the packets 912).

The initiator STA 102 sends the ACKs to both or only one STA antenna 904A-B. Another possibility is to send the ACKs to only a primary STA antenna 904A. The protocol 900 as illustrated shows a first option of an enhanced SLS protocol. The protocol 900 as illustrated includes a 2×2 MIMO configuration (two initiator STA antennas and two STA antennas 904A-B) for simplicity. However the protocol can be extended for any N×M MIMO configuration (where N is the number initiator STA antennas and M is the number of STA antennas 904).

The duration for the protocol 900 can be determined using Equation 4:

$$T_{ESLS\ OPT3} = 2*(T_1+T_2) + M*T_{SSW-ACK}$$

See FIG. 9 for the durations of $T_1$, $T_2$, and $T_{ACK}$.

Figure 10:
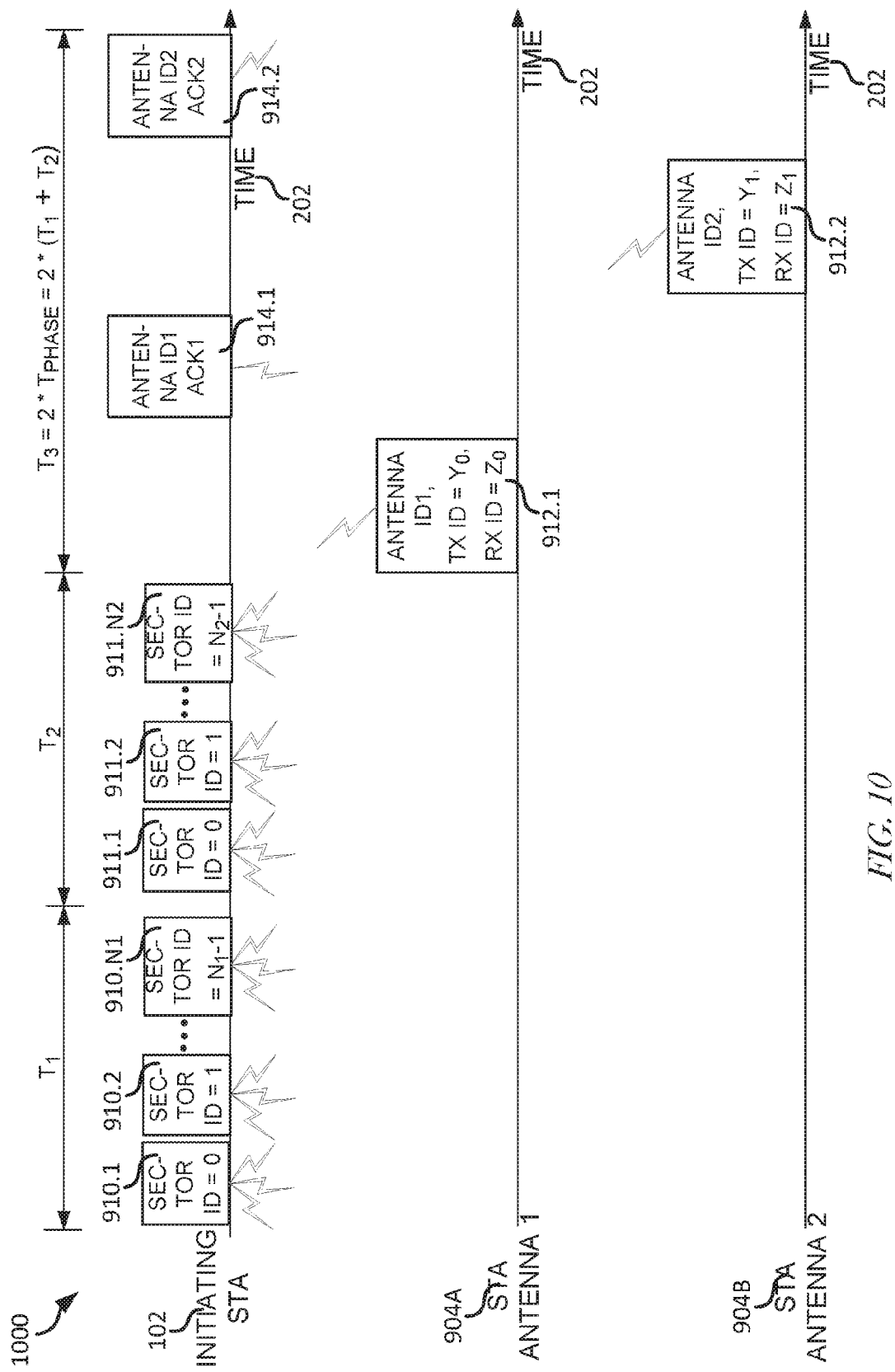
FIG. 10 illustrates a block diagram of an ESLS beamforming protocol for two or more STA antennas (or polarizations) of the same STA in accord with one or more embodiments.

FIG. 10 illustrates a block diagram of an ESLS beamforming protocol 1000 for two or more STA antennas 904A-C of the same STA in accord with one or more embodiments. The protocol 1000 is similar to the protocol 900 with the protocol 1000 including SSW-FB frames 912 and the SSW-ACK frames 914 interlaced in time rather than independently sequential in time as shown in FIG. 9. Thus, the initiator STA 102 provides the SSW-ACK frame 914.1 after receiving the SSW-FB frame 912.1 and before receiving the SSW-FB frame 912.2. Whereas, in the protocol 900 the SSW-FB frames 912 are all provided to the initiator STA 102 before the initiator STA 102 provides any of the SSW-ACK frames 914 (i.e. the SSW-FB frames 912 and SSW-ACK frames 914 are provided independently sequential in time in the protocol 900). The total time duration of the protocol can be determined using Equation 5:

$$T_{ESLS\ OPT4} = 3*(T_1+T_2)$$

Figure 11:
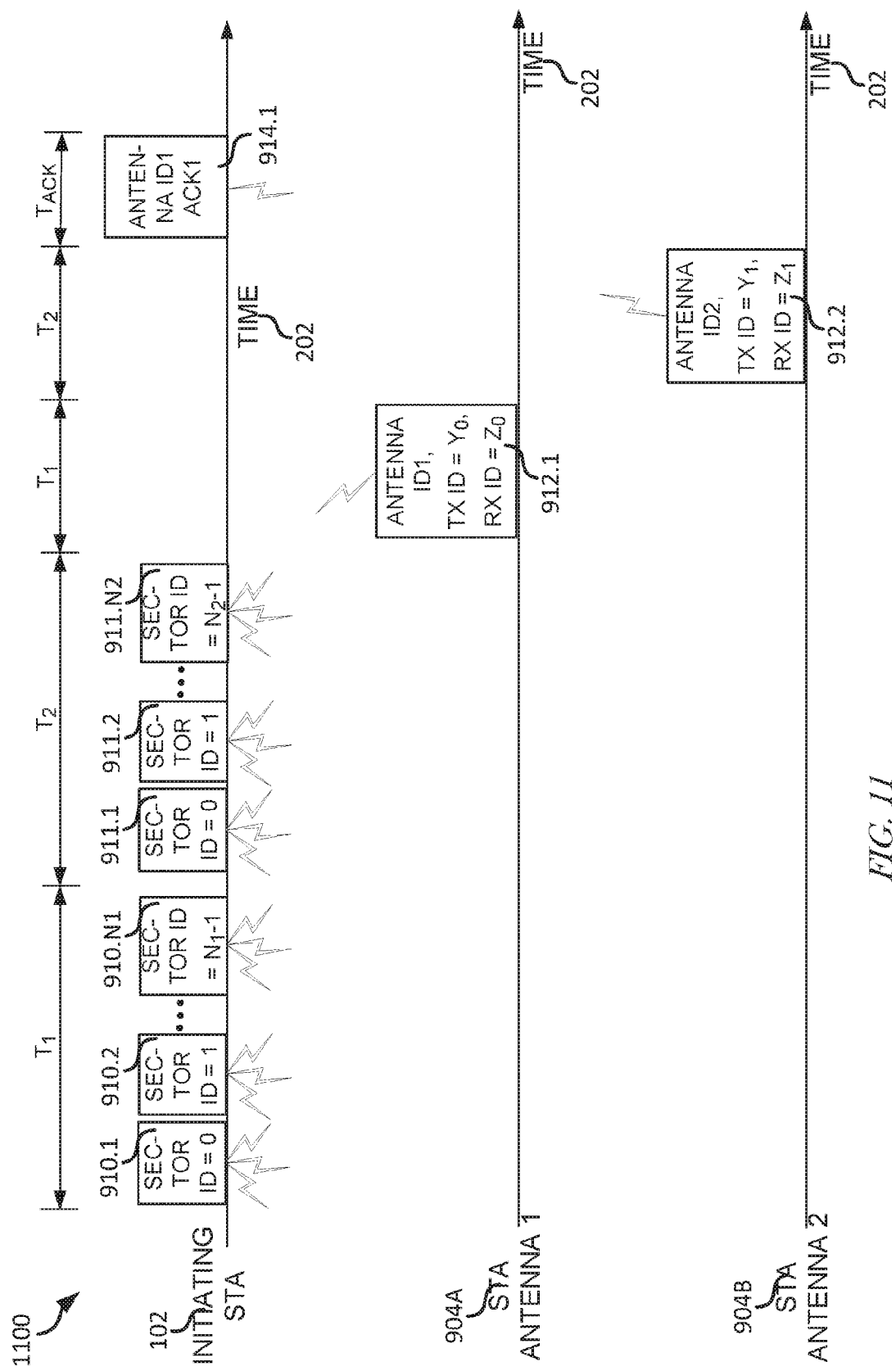
FIG. 11 illustrates a block diagram of an ESLS beamforming protocol for two or more STA antennas (or polarizations) of the same STA in according with one or more embodiments.

FIG. 11 illustrates a block diagram of an ESLS beamforming protocol 1100 for two or more STA antennas 904A-C of the same STA in accord with one or more embodiments. The protocol 1100 is similar to the protocol 900 with the protocol 1100 including only a single ACK 914.1 to a primary antenna 904A of the STA. The total time duration of the protocol can be determined using Equation 6:

$$T_{ESLS\ OPT5} = 2*(T_1+T_2) + T_{SSW-ACK}$$

The protocol 1100 reduces the time as compared to the protocol 900 by reducing the number of SSW-ACK packets 914 sent. Another possible ESLS protocol includes the STA antennas 904 only providing a single SSW-FB frame 912, such as from the primary antenna. However, since RX beamforming can be performed for each antenna regardless of the number of SSW-FB frames sent, this option may not reduce the overall time (as compared to the protocols 900, 1000, and/or 1100).

Figure 12:
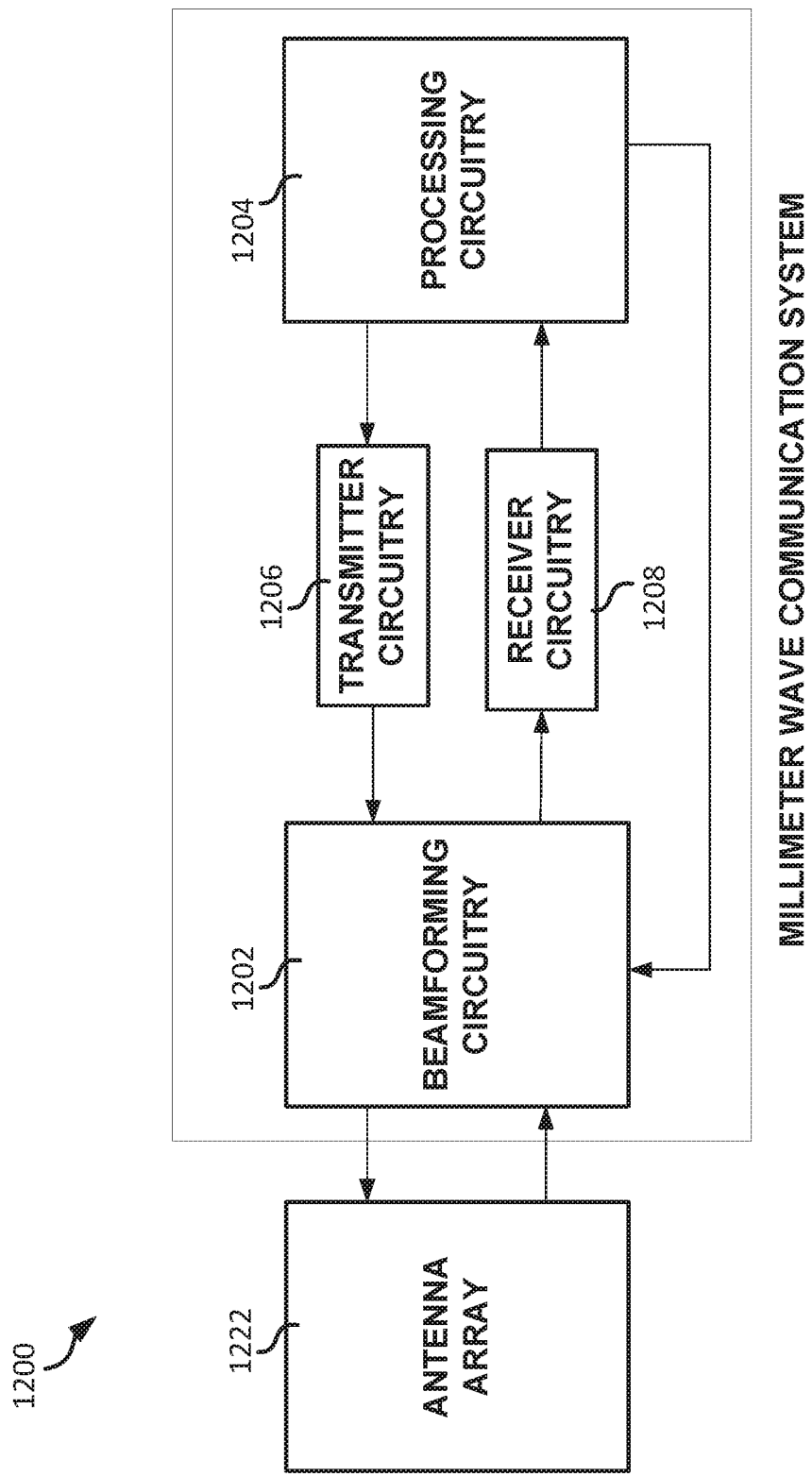
FIG. 12 illustrates a logical block diagram of a millimeter-wave communication station in accord with one or more embodiments.

FIG. 12 is a block diagram of a millimeter-wave communication station, in accordance with some embodiments. Millimeter-wave communication station 1200 may include, among other things, an array antenna 1222, beamforming circuitry 1202, transmitter circuitry 1206, receiver circuitry 1208 and processing circuitry 1204. Millimeter-wave communication station 1200 may be suitable for use in any one or more of initiator STA 102, legacy device 106, and responder STAs 104A-C as discussed above. The millimeter-wave communication station 1200 may be a part of or coupled to PHY layer circuitry 1304 or MAC layer circuitry 1306 (see FIG. 13). Array antenna 1222 may include a plurality of antenna elements and may be configured to communicate in a plurality of antenna sectors. In some alternate embodiments, millimeter-wave communication station 1200 may utilize a switched-beam antenna, although the scope of the embodiments is not limited in this respect. In some alternate embodiments, millimeter-wave communication station 1200 may utilize a single antenna element, although the scope of the embodiments is not limited in this respect.

In accord with some embodiments, beamforming circuitry 1202 may configure array antenna 1222 to transmit an ESSW frame 510 or 910 and/or SSW-ACK frame 514 or 914 separately in each of the antenna sectors. Beamforming circuitry 1202 may also configure array antenna 1222 to receive the SSW-FB frames 512 or 912.

In accord with some embodiments, when millimeter-wave communication station 1200 operates as an initiator STA (e.g., the initiator STA 102) for performing multiple-access beamforming with one or more responder STA (e.g., the responder STAs 104), the processing circuitry 1204 may be configured to encode the ESSW frames 510 or 910 and/or the SSW-ACK frames 514 or 914. The receiver circuitry

1208 may be configured to receive one or more SSW-FB frames 512 or 912 from one or more of the responder STAs. The transmitter circuitry 1206 may be configured to transmit one or more ESSW frames 510 or 910 and/or SSW-ACK frames 514 or 914 to the responder STAs to indicate to the responder STAs an antenna configuration for communication with the initiator STA.

In accordance with some embodiments, when millimeter-wave communication station 1200 operates in a responder STA, for performing multiple-access beamforming with an initiator STA, the processing circuitry 1204 may decode the ESSW frame 510 or 910 and/or SSW-ACK frames 514 or 914 and encode the SSW-FB frame 512 or 912. The processing circuitry 1204 may determine which sector of the initiator STA corresponds to a highest received RSS and/or SNR. The transmitter circuitry 1206 may transmit one or more SSW-FB frames 512 or 912 to the initiator STA. The receiver circuitry 708 may be configured to receive one or more ESSW frames 510 or 910 or SSW-ACK frames 514 or 914.

Millimeter-wave communication station 1200 may include other circuitry for communicating millimeter-wave wireless communication signals, including 60 GHz wireless technologies. In some embodiments, millimeter-wave communication station 1200 can be used to provide a flexible interface that can be efficiently embedded into home media gateways, cell phones, flat panel televisions (TVs), set-top boxes, Blu-ray players, digital cameras, personal computers (PCs), laptops, and many other multimedia and communication devices. Although millimeter-wave communication station 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of millimeter-wave communication station 700 may refer to one or more processes operating on one or more processing elements.

Figure 13:
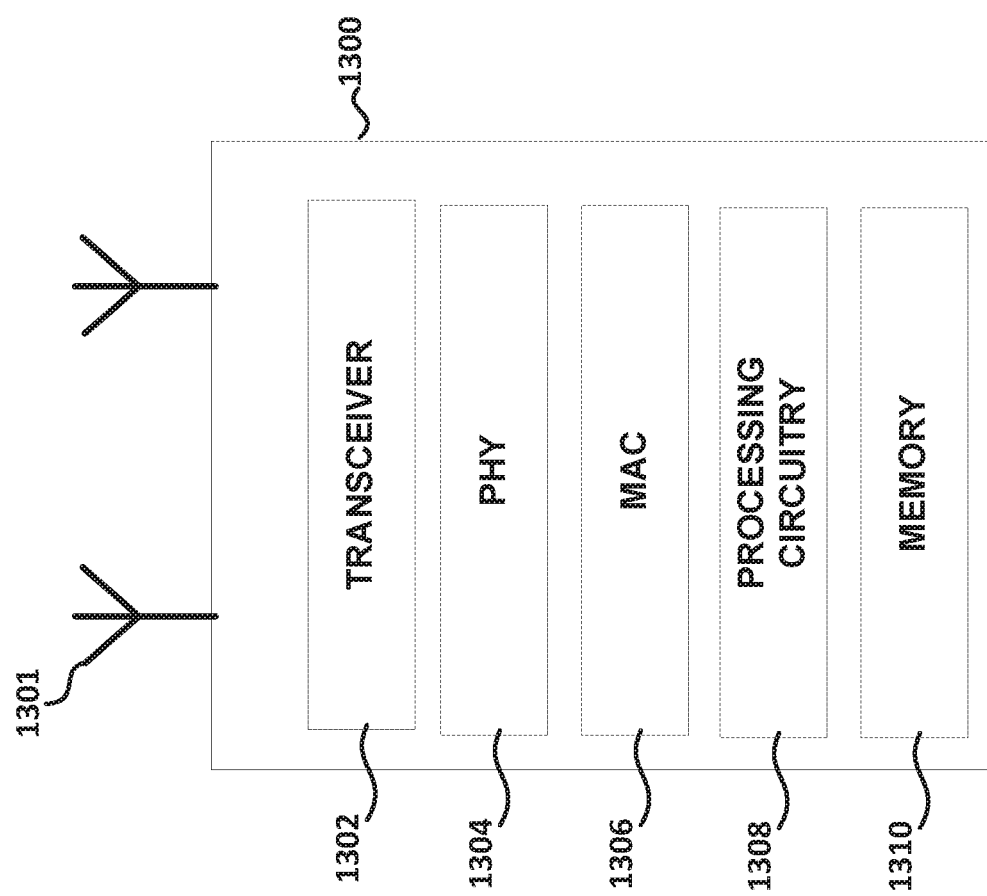
FIG. 13 illustrates a logical block diagram of a device in accord with one or more embodiments.

FIG. 13 illustrates a device 1300 in accord with one or more embodiments. device 1300 may be an IEEE 802.11 compliant device that may be arranged to communicate with one or more other devices, such as responder STAs 104 (FIG. 1) or initiator STA 102 (FIG. 1) as well as communicate with legacy devices 106 (FIG. 1). Responder STAs 104 and legacy devices 106 may also be referred to as HEW devices and legacy STAs, respectively. The device 1300 may be suitable for operating as an initiator STA 102 (FIG. 1) or a responder STA 104 (FIG. 1). In accord with embodiments, the device 1300 may include, among other things, a transmit/receive element 1301 (for example an antenna), a transceiver 1302, physical (PHY) circuitry 1304, and media access control (MAC) circuitry 1306. PHY circuitry 1304 and MAC circuitry 1306 may be HEW compliant layers and may also be compliant with one or more legacy IEEE 802.11 standards. MAC circuitry 1306 may be arranged to configure packets such as a physical layer convergence procedure (PLCP) protocol data unit (PPDUs) and arranged to transmit and receive PPDUs, among other things. The device 1300 may also include circuitry 1308 and memory 1310 configured to perform the various operations described herein. The circuitry 1308 may be coupled to the transceiver 1302, which may be coupled to the transmit/receive element 1301. While FIG. 13 depicts the circuitry 1308 and the transceiver 1302 as separate components, the circuitry 1308 and the transceiver 1302 may be integrated together in an electronic package or chip.

In one or more embodiments, the MAC circuitry 1306 may be arranged to contend for a wireless medium during a contention period to receive control of the medium for the control period and configure a PPDU. In one or more embodiments, the MAC circuitry 1306 may be arranged to contend for the wireless medium based on channel contention settings, a transmitting power level, and a CCA level.

The PHY circuitry 1304 may be arranged to transmit the HEW PPDU. The PHY circuitry 1304 may include circuitry for modulation/demodulation, upconversion/downconversion, filtering, amplification, etc. In one or more embodiments, the circuitry 1308 may include one or more processors. The circuitry 1308 may be configured to perform functions based on instructions being stored in a RAM or ROM, or based on special purpose circuitry. The circuitry 1308 may include processing circuitry and/or transceiver circuitry in accord with one or more embodiments. The circuitry 1308 may include a processor such as a general purpose processor or special purpose processor. The circuitry 1308 may implement one or more functions associated with transmit/receive elements 1301, the transceiver 1302, the PHY circuitry 1304, the MAC circuitry 1306, and/or the memory 1310.

In one or more embodiments, the circuitry 1308 may be configured to perform one or more of the functions and/or methods described herein and/or in conjunction with FIGS. 1-11.

In one or more embodiments, the transmit/receive elements 1301 may be two or more antennas that may be coupled to the PHY circuitry 1304 and arranged for sending and receiving signals including transmission of the packets. The transceiver 1302 may transmit and receive data such as PPDU and packets that include an indication that the device 1300 should adapt the channel contention settings according to settings included in the packet. The memory 1310 may store information for configuring the other circuitry to perform operations for configuring and transmitting packets and performing the various operations to perform one or more of the functions and/or methods described herein and/or in conjunction with FIGS. 1-6.

In one or more embodiments, the device 600 may be configured to communicate using OFDM communication signals over a multicarrier communication channel. In one or more embodiments, device 1300 may be configured to communicate in accord with one or more specific communication standards, such as the Institute of Electrical and Electronics Engineers (IEEE) standards including IEEE 802.11-2012, 802.11n-2009, 802.11ac-2013, 802.11ax, 802.11ay, DensiFi, standards and/or proposed specifications for WLANs, or other standards as described in conjunction with FIG. 1, although the scope of the invention is not limited in this respect as they may also be suitable to transmit and/or receive communications in accord with other techniques and standards. In one or more embodiments, the device 1300 may use 4× symbol duration of 802.11n or 802.11ac.

In one or more embodiments, the device 1300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In one or more embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1301 may comprise one or more directional or omnidirectional antennas, including, for example, dipole antennas, monopole antennas, patch antennas, loop antennas, microstrip antennas or other types of antennas suitable for transmission of RF signals. In one or more multiple-input multiple-output (MIMO) embodiments, the antennas may be effectively separated to take advantage of spatial diversity and the different channel characteristics that may result.

Although the device 1300 is illustrated as having several separate functional elements, one or more of the functional elements may be combined and may be implemented by combinations of software-configured elements, such as processing elements including digital signal processors (DSPs), and/or other hardware elements. For example, one or more elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In one or more embodiments, the functional elements may refer to one or more processes operating on one or more processing elements.

Figure 14:
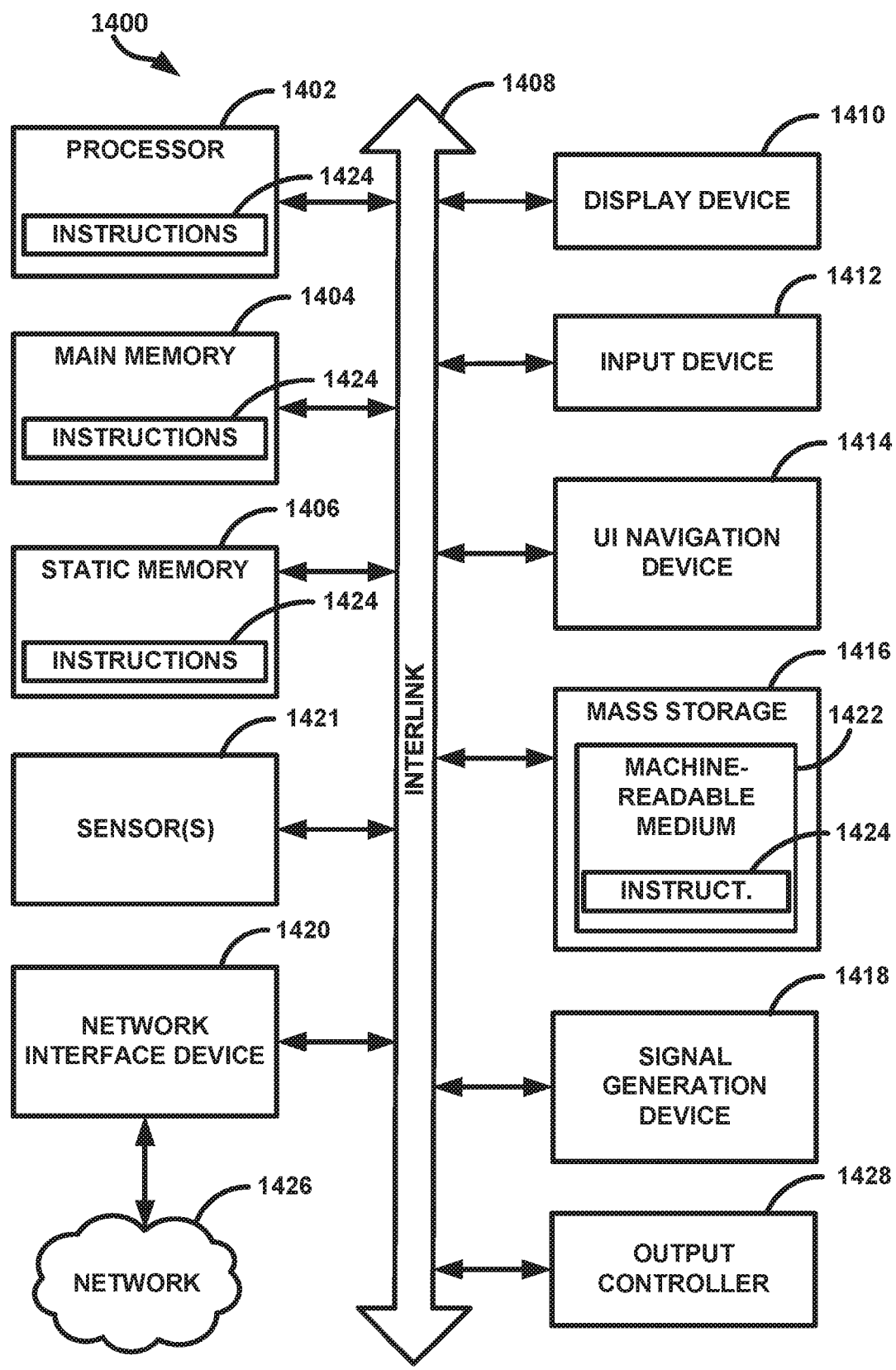
FIG. 14 illustrates, by way of example, a logical block diagram of a machine in accord with one or more embodiments on which one or more of the methods as discussed herein can be implemented.

FIG. 14 illustrates, by way of example, a block diagram of an embodiment of a machine 1400, in accord with one or more embodiments, on which one or more of the methods as discussed herein can be implemented. The machine 1400 can be a part of an initiator STA 102 and/or a responder STA 104. One or more of the initiator STA 102 and/or the responder STA 104 can include one or more of the items of the machine 300. In one or more embodiments, the mater STA 102 and/or the responder STA 104 can be implemented by the machine 1400. In alternative embodiments, the machine 1400 operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The example machine 1400 includes a processor 1402 (e.g., a central processing unit (CPU), a graphics processing unit (GPU) or both), a main memory 1404 and a static memory 1406, which communicate with each other via a bus 1408. The machine 1400 may further include a video display unit 1410 (e.g., a liquid crystal display (LCD) or a cathode ray tube (CRT)). The machine 1400 may include an alphanumeric input device 1412 (e.g., a keyboard), a user interface (UI) navigation device 1414 (e.g., a mouse), a disk drive unit 1416, a signal generation device 1418 (e.g., a speaker) and a network interface device 1420.

The memory 1404 or 1406 are examples of a storage device that can include instructions stored thereon that are executed by a machine, such as a processor or other processing circuitry, and cause the machine to perform operations. The storage device can be programmed and maintained prior to its inclusion in a BIT system. The instructions and other information can be encrypted or otherwise protected by one or more security measures, such as to help protect the operational boundaries and other data stored thereon.

The disk drive unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1424 may further be transmitted or received over a communications network 1426 using a transmission medium. The instructions 1424 may be transmitted using the network interface device 1420 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Examples of items that can be implemented using modules and described herein include the association circuitry 208, channel condition circuitry 218, processing circuitry 204 and 214, PHY 604, MAC 606, transceiver 602, 2026, and 216, or the like. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C, C++, C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

In an example, the hardware can include configurable execution units (e.g., transistors, logic gates (e.g., combinational and/or state logic), circuits, etc.) and a machine readable medium containing instructions, where the instructions configure the execution units to carry out a specific operation when in operation. The configuring can occur under the direction of the executions units or a loading mechanism. Accordingly, the execution units (e.g., processing circuitry, such as can include one or more hardware processors, transistors, resistors, capacitors, inductors, state machines or other logic gates, multiplexers, radios, sensors or other electrical or electronic components) can be communicatively coupled to the machine readable medium when the device is operating. In this example, the execution units can be a user (e.g., personnel) of more than one module. For example, under operation, the execution units can be configured by a first set of instructions to implement a first module at one point in time and reconfigured by a second set of instructions to implement a second module. The system 200 as illustrated includes a plurality of separate modules. The modules can be implemented with the division of operations as explained herein or the division of operations can be different such that a single module implements one or more of the operations of two or more of the modules or multiple modules implement the operations of one of the modules.

An advantage of the ESLS protocol described can include guaranteeing that the beamforming duration for the STA connection to the AP grows slowly with the number of STAs. In contrast, the beamforming duration using the legacy IEEE 802.11ad SLS protocol grows linearly with the number of STAs. An advantage of the ESLS protocol can include using a reciprocity of a receive/transmit mode, such as to help avoid using an omni regime at the initiator STA. Such a configuration enhances a link budget, such as can be particularly helpful in an outdoor hotspot scenario where the distances between the STA and AP can be up to about 200 meters. In one or more embodiments, the ESLS protocol uses the frames with full backward compatibility to the IEEE 802.11ad standard and allows legacy DMG devices to decode these frames and discard them based on special fields of the frame header. In one or more embodiments, the ESLS protocol provides for BT of EDMG devices with different beamforming capabilities (e.g., antenna type, number of elements in phased antenna arrays, and the like). Thus, the STAs can use enhanced training (TRN) units appended to the SSW frame(s) in different ways. An advantage of one or more of the ESLS protocols includes support for a MU-MIIMO mode of operation for EDMG devices.

Additional Notes

The present subject matter may be described by way of several examples.

Example 1 may include or use subject matter (such as an apparatus, a method, a means for performing acts, or a device readable memory including instructions that, when performed by the device, may configure the device to perform acts), such as may include or use an apparatus of an initiator station (STA), the apparatus comprising physical (PHY) layer circuitry and medium access control (MAC) layer circuitry configured to be coupled to a first plurality of antennas, the PHY layer circuitry and MAC layer circuitry configured to transmit, to one or more responder STAs including one of (1) a plurality of responder STAs and (2) only a single responder STA including a plurality of antennas, an enhanced sector sweep (ESSW) frame for each of a plurality of transmit (TX) sectors, wherein each of the plurality of TX sectors correspond to a weight vector for the first plurality of antennas, each ESSW frame including a plurality of training (TRN) units to simultaneously beam-forming train all of the (1) plurality of responder STAs or (2) the second plurality of antennas, receive, from the one or more STAs, an SSW feedback (SSW-FB) frame, each SSW-FB frame indicating a TX sector of the plurality of TX sectors and a receive (RX) sector of a corresponding STA of the one or more STAs to be used in communication between the initiator STA and the responder STA; and transmit one or more SSW acknowledgement (SSW-ACK) frames to the one or more responder STAs to verify the TX sector and RX sector to use for communication.

Example 2 can include or use, or can optionally be combined with the subject matter of Example 1, to include or use a first plurality of antennas coupled to the PHY layer circuitry and a MAC layer circuitry, and wherein the one or more responder STAs includes the single responder STA including the second plurality of antennas, and wherein the PHY layer, MAC circuitry, and the first plurality of antennas are configured to transmit to one or more responder STAs a sector sweep (SSW) frame for each of a plurality of transmit (TX) sectors, includes the PHY layer, MAC circuitry, and the first plurality of antennas are configured to transmit to the single STA an SSW frame for each of a plurality of TX sectors of each of the first plurality of antennas.

Example 3 can include or use, or can optionally be combined with the subject matter of Example 1, to include or use, wherein the one or more responder STAs includes the plurality of responder STAs and the PHY layer circuitry and MAC layer circuitry are configured to communicate using a multiple user (MU) multiple input multiple output (MIMO) communication protocol.

Example 4 can include or use, or can optionally be combined with the subject matter of Example 3, to include or use, wherein the SSW-FB frames include one SSW-FB frame from each of the plurality of STAs transmitted before the transmission of the one or more SSW-ACK frames, and wherein the SSW-ACK frames include one SSW-ACK frame for each of the plurality STAs that did not indicate a conflicting TX sector in the SSW-FB frame.

Example 5 can include or use, or can optionally be combined with the subject matter of at least one of Examples 1 and 3-4, to include or use, wherein the SSW feedback (SSW-FB) frames include one SSW-FB frame from each of the plurality of STAs, and wherein the SSW-FB and SSW-ACK frames are interlaced in time.

Example 6 can include or use, or can optionally be combined with the subject matter of at least one of Examples 1 and 3-5, to include or use, wherein the SSW-FB frame from each of the plurality of STAs is received in a directional reception in accord with the TX sector indicated in the SSW-FB frame.

Example 7 can include or use, or can optionally be combined with the subject matter of at least one of Examples 1-6, to include or use, wherein the ESSW frame is transmitted in accord with a directional or omni-directional transmission and received in accord with a directional or omni-direction reception, respectively.

Example 8 can include or use, or can optionally be combined with the subject matter of at least one of Examples 1-7, to include or use, wherein the SSW-ACK frame is transmitted in a directional transmission in accord with the TX sector indicated in the SSW-FB frame.

Example 9 can include or use, or can optionally be combined with the subject matter of at least one of Examples 1-8, to include or use, wherein the station is an enhanced directional multi-gigabyte (EDMG) station.

Example 10 can include or use, or can optionally be combined with the subject matter of at least one of Examples 1-9, to include or use, wherein the PHY and MAC layer circuitry are configured to operate in accordance with Electrical and Electronic Engineering (IEEE) 802.11ay.

Example 11 can include or use, or can optionally be combined with the subject matter of at least one of Examples 1-10, to include or use, wherein each of the ESSW frames is discarded by a legacy device because a header of the ESSW frame is not decodable by the legacy device.

Example 12 can include or use, or can optionally be combined with the subject matter of at least one of Examples 1-11, to include or use, wherein the wireless device is one from the following group: an Institute of Electrical and Electronic Engineering (IEEE) 802.11ay initiator STA, an IEEE 802.11ay personal basic service set (PBSS) Control Point (PCP), and an IEEE 802.11ay station.

Example 13 can include or use, or can optionally be combined with the subject matter of at least one of Examples 1-12, to include or use a transceiver coupled to a plurality of antennas and memory coupled to the PHY layer circuitry and the MAC layer circuitry, wherein the antennas are configured as a large aperture array or a modular array configured for beamforming millimeter-wave signals.

Example 14 may include or use subject matter (such as an apparatus, a method, a means for performing acts, or a device readable memory including instructions that, when performed by the device, may configure the device to perform acts), such as may include or use a non-transitory computer-readable storage medium that stores instructions for execution by one or more processors to perform operations for beamforming on a wireless device, the operations configure the wireless device to transmit, to one or more responder stations (STAs) including one of (1) a plurality of responder STAs and (2) the single responder STA including a plurality of antennas, an enhanced sector sweep (ESSW) frame for each of a plurality of transmit (TX) sectors, wherein each of the plurality of TX sectors correspond to a weight vector for a plurality of antennas of the wireless device, each ESSW frame including a plurality of training (TRN) units to simultaneously train (1) a plurality of responder STAs or (2) the plurality of antennas, receive, from one of (1) the plurality of responder STAs and (2) the single responder STA including a plurality of antennas, an SSW feedback (SSW-FB) frame, each SSW-FB frame indicating a TX sector of the plurality of TX sectors and a receive (RX) sector of a corresponding STA of the one or more STAs to be used in communication between the initiator STA and the responder STA, the TX sector determined using the plurality of training units of the ESSW frame, and transmit one or more SSW acknowledgement (SSW-ACK) frames to the one or more responder STAs in a directional transmission in accord with the TX sector in the SSW-FB frame to verify the TX sector to use for communication.

Example 15 can include or use, or can optionally be combined with the subject matter of Example 14, to include or use, wherein each of the ESSW frames is transmitted to a plurality of antennas of only the single responder STA to communicate using a single user multiple input multiple output (SU-MIMO) communication protocol, wherein the ESSW frames include an EESW frame for each of a plurality of transmit (TX) sectors of each of a plurality of antennas of the wireless device.

Example 16 can include or use, or can optionally be combined with the subject matter of Example 14, to include or use, wherein each of the ESSW frames is transmitted to the plurality of responder STAs to communicate using a multiple user (MU) multiple input multiple output (MIMO) communication protocol, wherein the SSW-FB frames include one SSW-FB frame from each of the plurality of STAs transmitted before the transmission of the one or more SSW-ACK frames, wherein the SSW-ACK frames include one SSW-ACK frame for each of the plurality STAs that did not indicate a conflicting TX sector in the SSW-FB frame, and wherein the SSW-FB frame from each of the plurality of STAs is received in a directional reception in accord with the TX sector indicated in the SSW-FB frame.

Example 17 can include or use, or can optionally be combined with the subject matter of Example 14, to include or use, wherein the one or more responder STAs includes the single responder STA including a second plurality of antennas, and wherein the PHY layer, MAC circuitry, and wherein transmitting to one or more responder STAs a sector sweep (SSW) frame for each of a plurality of transmit (TX) sectors includes the PHY layer, MAC circuitry, and the first plurality of antennas are configured to transmit to the single STA an SSW frame for each of a plurality of TX sectors of each of a first plurality of antennas of the wireless device.

Example 18 can include or use, or can optionally be combined with the subject matter of Example 14, to include or use, wherein the one or more responder STAs includes the plurality of responder STAs and the PHY layer circuitry and MAC layer circuitry are configured to communicate using a multiple user (MU) multiple input multiple output (MIMO) communication protocol.

Example 19 can include or use, or can optionally be combined with the subject matter of Example 18, to include or use, wherein the SSW-FB frames include one SSW-FB frame from each of the plurality of STAs transmitted before the transmission of the one or more SSW-ACK frames, and wherein the SSW-ACK frames include one SSW-ACK frame for each of the plurality STAs that did not indicate a conflicting TX sector in the SSW-FB frame.

Example 20 can include or use, or can optionally be combined with the subject matter of Example 18, to include or use, wherein the SSW feedback (SSW-FB) frames include one SSW-FB frame from each of the plurality of STAs, and wherein the SSW-FB and SSW-ACK frames are interlaced in time.

Example 21 can include or use, or can optionally be combined with the subject matter of at least one of Examples 14-20, to include or use, wherein the SSW-FB frame from each of the plurality of STAs is received in a directional reception in accord with the TX sector indicated in the SSW-FB frame.

Example 22 can include or use, or can optionally be combined with the subject matter of at least one of Examples 14-21, to include or use, wherein the ESSW frame is transmitted in accord with a directional or omni-directional transmission and received in accord with a directional or omni-direction reception, respectively.

Example 23 can include or use, or can optionally be combined with the subject matter of at least one of Examples 14-22, to include or use, wherein the SSW-ACK frame is transmitted in a directional transmission in accord with the TX sector indicated in the SSW-FB frame.

Example 24 can include or use, or can optionally be combined with the subject matter of at least one of Examples 14-23, to include or use, wherein the one or more stations are enhanced directional multi-gigabyte (EDMG) stations.

Example 25 can include or use, or can optionally be combined with the subject matter of at least one of Examples 14-24, to include or use, wherein each of the SSW frames is discarded by a legacy device because a header of the ESSW frame is not decodable by the legacy device.

Example 26 can include or use, or can optionally be combined with the subject matter of at least one of Examples 14-25, to include or use, wherein the wireless device is one from the following group: an Institute of Electrical and Electronic Engineering (IEEE) 802.11ay initiator STA, an IEEE 802.11ay personal basic service set (PBSS) Control Point (PCP), and an IEEE 802.11ay station.

Example 27 may include or use subject matter (such as an apparatus, a method, a means for performing acts, or a device readable memory including instructions that, when performed by the device, may configure the device to perform acts), such as may include or use a method performed by an initiator station (STA) for beamforming training, the method comprising transmitting, from physical layer (PHY) circuitry and medium access control layer (MAC) circuitry and to one or more responder stations (STAs) including one of (1) a plurality of responder STAs and (2) the single responder STA including a plurality of antennas, an enhanced sector sweep (ESSW) frame for each of a plurality of transmit (TX) sectors, wherein each of the plurality of TX sectors correspond to a weight vector for a plurality of antennas of the wireless device, each ESSW frame including a plurality of training (TRN) units to simultaneously train (1) a plurality of responder STAs or (2) the plurality of antennas, receiving, from the one or more STAs, an SSW feedback (SSW-FB) frame, each SSW-FB frame indicating a TX sector of the plurality of TX sectors and a receive (RX) sector of a corresponding STA of the one or more STAs to be used in communication between the initiator STA and the responder STA, the TX sector determined using the plurality of training units of the ESSW frame, and transmitting one or more SSW acknowledgement (SSW-ACK) frames to the one or more responder STAs in a directional transmission in accord with the TX sector in the SSW-FB frame to verify the TX sector to use for communication.

Example 28 can include or use, or can optionally be combined with the subject matter of Example 27, to include or use, wherein each of the ESSW frames is transmitted to the plurality of antennas of only the single responder STA to communicate using a single user multiple input multiple output (SU-MIMO) communication protocol, wherein the ESSW frames include an EESW frame for each of a plurality of transmit (TX) sectors of each of a plurality of antennas of the wireless device.

Example 29 can include or use, or can optionally be combined with the subject matter of Example 27, to include or use, wherein each of the ESSW frames is transmitted to the plurality of responder STAs to communicate using a multiple user (MU) multiple input multiple output (MIMO) communication protocol, wherein the SSW-FB frames include one SSW-FB frame from each of the plurality of STAs transmitted before the transmission of the one or more SSW-ACK frames, wherein the SSW-ACK frames include one SSW-ACK frame for each of the plurality STAs that did not indicate a conflicting TX sector in the SSW-FB frame, and wherein the SSW-FB frame from each of the plurality of STAs is received in a directional reception in accord with the TX sector indicated in the SSW-FB frame.

Example 30 can include or use, or can optionally be combined with the subject matter of Example 27, to include or use, wherein the one or more responder STAs includes the single responder STA including a second plurality of antennas, and wherein transmitting to one or more responder STAs a sector sweep (SSW) frame for each of a plurality of transmit (TX) sectors includes the PHY layer, MAC circuitry, and a first plurality of antennas transmitting to the single STA an SSW frame for each of a plurality of TX sectors of each of the first plurality of antennas.

Example 31 can include or use, or can optionally be combined with the subject matter of Example 27, to include or use, wherein the one or more responder STAs includes the plurality of responder STAs and the PHY layer circuitry and MAC layer circuitry are configured to communicate using a multiple user (MU) multiple input multiple output (MIMO) communication protocol.

Example 32 can include or use, or can optionally be combined with the subject matter of Example 27, to include or use, wherein the SSW-FB frames include one SSW-FB frame from each of the plurality of STAs transmitted before the transmission of the one or more SSW-ACK frames, and wherein the SSW-ACK frames include one SSW-ACK frame for each of the plurality STAs that did not indicate a conflicting TX sector in the SSW-FB frame.

Example 33 can include or use, or can optionally be combined with the subject matter of Example 27, to include or use, wherein the SSW feedback (SSW-FB) frames include one SSW-FB frame from each of the plurality of STAs, and wherein the SSW-FB and SSW-ACK frames are interlaced in time.

Example 34 can include or use, or can optionally be combined with the subject matter of at least one of Examples 27-33, to include or use, wherein the SSW-FB frame is received in a directional reception in accord with the TX sector indicated in the SSW-FB frame.

Example 35 can include or use, or can optionally be combined with the subject matter of at least one of Examples 27-34, to include or use, wherein the ESSW frame is transmitted in accord with a directional or omni-directional transmission and received in accord with a directional or omni-direction reception, respectively.

Example 36 can include or use, or can optionally be combined with the subject matter of at least one of Examples 27-35, to include or use, wherein the SSW-ACK frame is transmitted in a directional transmission in accord with the TX sector indicated in the SSW-FB frame.

Example 37 can include or use, or can optionally be combined with the subject matter of at least one of Examples 27-33, to include or use, wherein each of the SSW frames is discarded by a legacy device because a header of the ESSW frame is not decodable by the legacy device.

Example 38 can include or use, or can optionally be combined with the subject matter of at least one of Examples 27-37, to include or use, wherein the initiator STA is one from the following group: an Institute of Electrical and Electronic Engineering (IEEE) 802.11ay initiator STA, an IEEE 802.11ay personal basic service set (PBSS) Control Point (PCP), and an IEEE 802.11ay station.

Example 39 may include or use subject matter (such as an apparatus, a method, a means for performing acts, or a device readable memory including instructions that, when performed by the device, may configure the device to perform acts), such as may include or use an apparatus of a responder station (STA), the apparatus comprising physical (PHY) layer circuitry and medium access control (MAC) layer circuitry, the PHY layer circuitry configured to be coupled to a first plurality of antennas, the PHY layer circuitry and MAC layer circuitry configured to receive, from an initiator STA, an enhanced sector sweep (ESSW) frame for each of a plurality of transmit (TX) sectors of the initiator STA, wherein each of the plurality of TX sectors correspond to a weight vector for the plurality of antennas, each ESSW frame including a plurality of training (TRN) units to simultaneously beamforming train all of one or more responder STA including one of (1) plurality of responder STAs including the responder STA or (2) the plurality of antennas, determine, simultaneously with one or more responder STAs and based on the TRN units, a received signal strength (RSS) of each of the TX sectors and which TX sector corresponds to a highest RSS, transmit an SSW feedback (SSW-FB) frame, each SSW-FB frame indicating the TX sector of the plurality of TX sectors that corresponds to the highest RSS and a receive (RX) sector of the responder STA, and receive one or more SSW acknowledgement (SSW-ACK) frames from the initiator STA in a directional transmission in accord with the TX sector in the SSW-FB frame to verify the TX sector to use for communication, and transmit an SSW feedback (SSW-FB) frame, each SSW-FB frame indicating a TX sector of the plurality of TX sectors and a receive (RX) sector of the responder STA.

Example 40 can include or use, or can optionally be combined with the subject matter of 39 Examples 27-37, to include or use, the first plurality of antennas coupled to the PHY layer circuitry and the MAC layer circuitry, and wherein the one or more responder STAs includes the single responder STA, and wherein the PHY layer, MAC circuitry, and the first plurality of antennas are configured to receive the ESSW frame for each of a plurality of transmit (TX) sectors, includes the PHY layer, MAC circuitry, and the first plurality of antennas are configured to receive at the single STA an SSW frame for each of a plurality of TX sectors of each of the first plurality of antennas.

Example 41 can include or use, or can optionally be combined with the subject matter of Example 39, to include or use, wherein the one or more responder STAs includes the plurality of responder STAs and the PHY layer circuitry and MAC layer circuitry are configured to communicate using a multiple user (MU) multiple input multiple output (MIMO) communication protocol.

Example 42 can include or use, or can optionally be combined with the subject matter of Example 41, to include or use, wherein the SSW-FB frames include one SSW-FB frame from each of the plurality of STAs transmitted before the reception of the one or more SSW-ACK frames, and wherein the SSW-ACK frames include one SSW-ACK frame for each of the plurality STAs that did not indicate a conflicting TX sector in the SSW-FB frame.

Example 43 can include or use, or can optionally be combined with the subject matter of Example 41, to include or use, wherein the SSW feedback (SSW-FB) frames include one SSW-FB frame from each of the plurality of STAs, and wherein the SSW-FB and SSW-ACK frames are interlaced in time.

Example 44 can include or use, or can optionally be combined with the subject matter of at least one of Examples 39-43, to include or use, wherein the SSW-FB frame is transmitted in a directional transmission in accord with the TX sector indicated in the SSW-FB frame.

Example 45 can include or use, or can optionally be combined with the subject matter of at least one of Examples 39-44, to include or use, wherein the ESSW frame is received in accord with a directional or omni-directional reception and transmitted in accord with a directional or omni-directional reception, respectively.

Example 46 can include or use, or can optionally be combined with the subject matter of at least one of Examples 39-45, to include or use, wherein the SSW-ACK frame is received in a directional transmission in accord with the TX sector indicated in the SSW-FB frame.

Example 47 can include or use, or can optionally be combined with the subject matter of at least one of Examples 39-46, to include or use, wherein the responder STA is an enhanced directional multi-gigabit (EDMG) station.

Example 48 can include or use, or can optionally be combined with the subject matter of at least one of Examples 39-47, to include or use, wherein the PHY and MAC layer circuitry are configured to operate in accordance with Electrical and Electronic Engineering (IEEE) 802.11ay.

Example 49 can include or use, or can optionally be combined with the subject matter of at least one of Examples 39-48, to include or use, wherein each of the SSW frames is discarded by a legacy device because a header of the ESSW frame is not decodable by the legacy device.

Example 50 can include or use, or can optionally be combined with the subject matter of at least one of Examples 39-49, to include or use, wherein the initiator STA is one from the following group: an Institute of Electrical and Electronic Engineering (IEEE) 802.11ay initiator STA, an IEEE 802.11ay personal basic service set (PBSS) Control Point (PCP), and an IEEE 802.11ay station.

Example 51 can include or use, or can optionally be combined with the subject matter of at least one of Examples 39-50, to include or use a transceiver coupled to the plurality of antennas and memory coupled to the PHY layer circuitry and the MAC layer circuitry, wherein the antennas are configured as a large aperture array or a modular array configured for beamforming millimeter-wave signals.

Example 52 may include or use subject matter (such as an apparatus, a method, a means for performing acts, or a device readable memory including instructions that, when performed by the device, may configure the device to perform acts), such as may include or use a method performed by one or more responder stations (STAs) for beamforming training, the method comprising receiving, at the one or more responder STAs including (1) a plurality of responder stations (STAs) and (2) a single responder STA including a first plurality of antennas, an enhanced sector sweep (ESSW) frame for each of a plurality of transmit (TX) sectors, wherein each of the plurality of TX sectors correspond to a weight vector for a second plurality of antennas of an initiator STA, each ESSW frame including a plurality of training (TRN) units, determining, simultaneously at each of the one or more responder STAs and based on the TRN units, a received signal strength (RSS) of each of the TX sectors and which TX sector corresponds to a highest RSS, transmitting, from the one or more responder STAs, an SSW feedback (SSW-FB) frame, each SSW-FB frame indicating the TX sector of the plurality of TX sectors that corresponds to the highest RSS, and a receive (RX) sector of a corresponding STA of the plurality of STAs or the single responder STA to be used in communication between the initiator STA and the responder STA, and receiving one or more SSW acknowledgement (SSW-ACK) frames from the initiator STA in a directional transmission in accord with the TX sector in the SSW-FB frame to verify the TX sector to use for communication.

Example 53 can include or use, or can optionally be combined with the subject matter of Example 52, to include or use, wherein the one or more responder STAs includes only the single responder STA with the first plurality of antennas, and receiving the ESSW frame for each of the plurality of TX sectors includes receiving at the single STA an ESSW frame for each of a plurality of TX sectors of each of the second plurality of antennas of the initiator STA.

Example 54 can include or use, or can optionally be combined with the subject matter of Example 53, to include or use, wherein the one or more responder STAs includes the plurality of responder STAs, wherein transmitting the SSW-FB frames includes transmitting one SSW-FB frame from each of the plurality of responder STAs before receiving the one or more SSW-ACK frames, and wherein the SSW-ACK frames include one SSW-ACK frame for each of the plurality STAs that did not indicate a conflicting TX sector in the SSW-FB frame.

Example 55 can include or use, or can optionally be combined with the subject matter of Example 54, to include or use, wherein transmitting the SSW feedback (SSW-FB) frames include one SSW-FB frame from each of the plurality of STAs, and wherein the SSW-FB and SSW-ACK frames are interlaced in time and transmitted in a directional transmission in accord with the TX sector determined to correspond to the highest RSS.

Example 56 can include or use, or can optionally be combined with the subject matter of Example 52, to include or use, wherein the SSW feedback (SSW-FB) frames include one SSW-FB frame from each of the plurality of STAs, and wherein the SSW-FB and SSW-ACK frames are interlaced in time.

Example 57 can include or use, or can optionally be combined with the subject matter of at least one of Examples 52-56, to include or use, wherein the SSW-FB frame is transmitted in a directional transmission in accord with the TX sector indicated in the SSW-FB frame.

Example 58 can include or use, or can optionally be combined with the subject matter of at least one of Examples 52-57, to include or use, wherein the ESSW frame is received in accord with a directional or omni-directional reception and transmitted in accord with a directional or omni-directional reception, respectively.

Example 59 can include or use, or can optionally be combined with the subject matter of at least one of Examples 52-58, to include or use, wherein the SSW-ACK frame is received in a directional transmission in accord with the TX sector indicated in the SSW-FB frame.

Example 60 can include or use, or can optionally be combined with the subject matter of at least one of Examples 52-59, to include or use, wherein the responder STA is an enhanced directional multi-gigabyte (EDMG) station.

Example 61 can include or use, or can optionally be combined with the subject matter of at least one of Examples 52-60, to include or use, wherein the PHY and MAC layer circuitry are configured to operate in accordance with Electrical and Electronic Engineering (IEEE) 802.11ay.

Example 62 can include or use, or can optionally be combined with the subject matter of at least one of Examples 52-61, to include or use, wherein each of the SSW frames is discarded by a legacy device because a header of the ESSW frame is not decodable by the legacy device.

Example 63 can include or use, or can optionally be combined with the subject matter of at least one of Examples 52-62, to include or use, wherein the initiator STA is one from the following group: an Institute of Electrical and Electronic Engineering (IEEE) 802.11ay initiator STA, an IEEE 802.11ay personal basic service set (PBSS) Control Point (PCP), and an IEEE 802.11ay station.

Example 64 may include or use subject matter (such as an apparatus, a method, a means for performing acts, or a device readable memory including instructions that, when performed by the device, may configure the device to perform acts), such as may include or use a non-transitory computer-readable storage medium that stores instructions for execution by one or more processors to perform operations for beamforming on a wireless device, the operations configure the wireless device to receive, at the wireless device including one of (1) a responder station (STA) of a plurality of responder STAs and (2) a single responder STA including a plurality of antennas, an enhanced sector sweep (ESSW) frame for each of a plurality of transmit (TX) sectors, wherein each of the plurality of TX sectors correspond to a weight vector for a plurality of antennas of an initiator STA, each ESSW frame including a plurality of training (TRN) units, determine, simultaneously at each of the one or more responder STAs and based on the TRN units, a received signal strength (RSS) of each of the TX sectors and which TX sector corresponds to a highest RSS, transmit, from the one or more responder STAs, an SSW feedback (SSW-FB) frame, each SSW-FB frame indicating the TX sector of the plurality of TX sectors that corresponds to the highest RSS, and a receive (RX) sector of a corresponding STA of the plurality of STAs or the single responder STA to be used in communication between the initiator STA and the responder STA, and receive one or more SSW acknowledgement (SSW-ACK) frames from the initiator STA in a directional transmission in accord with the TX sector in the SSW-FB frame to verify the TX sector to use for communication.

Example 65 can include or use, or can optionally be combined with the subject matter of Example 64, to include or use, wherein the wireless device includes only the single responder STA with the plurality of antennas, and the instructions for receiving the ESSW frame for each of the plurality of TX sectors include instructions for receiving at the single STA an ESSW frame for each of a plurality of TX sectors of each of the plurality of antennas of the initiator STA.

Example 66 can include or use, or can optionally be combined with the subject matter of Example 64, to include or use, wherein the wireless device is one of a plurality of responder STAs, and wherein the instructions for transmitting the SSW-FB frames include instructions for transmitting one SSW-FB frame from a responder STA of each of the plurality of responder STAs before receiving the one or more SSW-ACK frames, and wherein the SSW-ACK frames include one SSW-ACK frame for each of the plurality STAs that did not indicate a conflicting TX sector in the SSW-FB frame.

Example 67 can include or use, or can optionally be combined with the subject matter of Example 66, to include or use, wherein the SSW-FB and SSW-ACK frames are interlaced in time and transmitted in a directional transmission in accord with the TX sector determined to correspond to the highest RSS.

Example 68 can include or use, or can optionally be combined with the subject matter of Example 66, to include or use, wherein the SSW feedback (SSW-FB) frames include one SSW-FB frame from each of the plurality of STAs, and wherein the SSW-FB and SSW-ACK frames are interlaced in time.

Example 69 can include or use, or can optionally be combined with the subject matter of at least one of Examples 64-68, to include or use, wherein the SSW-FB frame is transmitted in a directional transmission in accord with the TX sector indicated in the SSW-FB frame.

Example 70 can include or use, or can optionally be combined with the subject matter of at least one of Examples 64-69, to include or use, wherein the ESSW frame is received in accord with a directional or omni-directional reception and transmitted in accord with a directional or omni-directional reception, respectively.

Example 71 can include or use, or can optionally be combined with the subject matter of at least one of Examples 64-70, to include or use, wherein the SSW-ACK frame is received in a directional transmission in accord with the TX sector indicated in the SSW-FB frame.

Example 72 can include or use, or can optionally be combined with the subject matter of at least one of Examples 64-71, to include or use, wherein the wireless device is an enhanced directional multi-gigabyte (EDMG) station.

Example 73 can include or use, or can optionally be combined with the subject matter of at least one of Examples 64-72, to include or use, wherein the PHY and MAC layer circuitry are configured to operate in accordance with Electrical and Electronic Engineering (IEEE) 802.11ay.

Example 74 can include or use, or can optionally be combined with the subject matter of at least one of Examples 64-73, to include or use, wherein each of the SSW frames is discarded by a legacy device because a header of the ESSW frame is not decodable by the legacy device.

Example 75 can include or use, or can optionally be combined with the subject matter of at least one of Examples 64-74, to include or use, wherein the initiator STA is one from the following group: an Institute of Electrical and Electronic Engineering (IEEE) 802.11ay initiator STA, an IEEE 802.11ay personal basic service set (PBSS) Control Point (PCP), and an IEEE 802.11ay station.

Example 76 can include or use, or can optionally be combined with the subject matter of at least one of Examples 1-75, to include or use, wherein the SSW-FB frame includes TRN-T units for transmit beamforming training.

The above detailed description includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. An apparatus of an initiator station (STA), the apparatus comprising:
    processing circuitry configured to be coupled to a first plurality of antennas, the processing circuitry configured to:
    transmit, to one or more responder STAs including one of (1) a plurality of responder STAs and (2) only a single responder STA including a second plurality of antennas, an enhanced sector sweep (ESSW) frame for each of a plurality of transmit (TX) sectors, wherein each of the plurality of TX sectors correspond to a weight vector for the first plurality of antennas, each ESSW frame including a sector sweep (SSW) packet appended with a plurality of receive training units to simultaneously beamforming train all of the (1) plurality of responder STAs or (2) the second plurality of antennas:
    receive, from the one or more responder STAs, an enhanced SSW feedback (SSW-FB) frame, each enhanced SSW-FB frame indicating a TX sector of the plurality of TX sectors and a receive (RX) sector of a corresponding STA of the one or more STAs to be used in communication between the initiator STA and the responder STA, and including a plurality of transmit training units; and
    transmit one or more SSW acknowledgement (SSW-ACK) frames to the one or more responder STAs to verify the TX sector and RX sector to use for communication based on the received TX sector, RX sector, and the plurality of transmit training units of the enhanced SSW-FB frame.

2. The apparatus of claim 1, wherein plurality of antennas is a first plurality of antennas and the one or more responder STAs includes the single responder STA including a second plurality of antennas, and wherein the processing circuitry and the first plurality of antennas are configured to transmit to the one or more responder STAs the ESSW frame for each of the plurality of transmit (TX) sectors includes the processing circuitry and the first plurality of antennas configured to transmit to the single STA the ESSW frame for each of a plurality of TX sectors of each of the first plurality of antennas.

3. The apparatus of claim 1, wherein the one or more responder STAs includes the plurality of responder STAs and the processing circuitry is configured to communicate using a multiple user (MU) multiple input multiple output (MIMO) communication protocol.

4. The apparatus of claim 3, wherein the enhanced SSW-FB frames include one enhanced SSW-FB frame from each of the plurality of STAs transmitted before the transmission of the one or more SSW-ACK frames, and wherein the SSW-ACK frames include one SSW-ACK frame for each of the plurality STAs that did not indicate a conflicting TX sector in the enhanced SSW-FB frame.

5. The apparatus of claim 3, wherein the enhanced SSW feedback (SSW-FB) frames include one enhanced SSW-FB frame from each of the plurality of STAs, and wherein the enhanced SSW-FB and SSW-ACK frames are interlaced in time.

6. The apparatus of claim 3, wherein the enhanced SSW-FB frame from each of the plurality of STAs is received in a directional reception in accord with the TX sector indicated in the enhanced SSW-FB frame.

7. The apparatus of claim 6, wherein the ESSW frame is transmitted in accord with a directional or omni-directional transmission and received in accord with a directional or omni-direction reception, respectively.

8. The apparatus of claim 7, wherein the SSW-ACK frame is transmitted in a directional transmission in accord with the TX sector indicated in the enhanced SSW-FB frame.

9. The apparatus of claim 1, wherein the one or more responder STAs are enhanced directional multi-gigabyte (EDMG) STAs.

10. The apparatus of claim 1, wherein the processing circuitry is configured as PHY and MAC layer circuitry to operate in accord with Institute of Electrical and Electronic Engineering (IEEE) 802.11ay.

11. The apparatus of claim 10, wherein each ESSW frame is discarded by a legacy device because a header of the ESSW frame is not decodable by the legacy device.

12. The apparatus of claim 10, wherein the initiator STA is one from the following group: an Institute of Electrical and Electronic Engineering (IEEE) 802.11ay initiator STA, an IEEE 802.11ay personal basic service set (PBSS) Control Point (PCP), and an IEEE 802.11ay station.

13. The apparatus of claim 10, further comprising a transceiver coupled to a plurality of antennas and memory coupled to the PHY layer circuitry and the MAC layer circuitry, wherein the first plurality of antennas are configured as a large aperture array or a modular array configured for beamforming millimeter-wave signals.

14. A non-transitory computer-readable storage medium that stores instructions for execution by one or more processors to perform operations for beamforming on a wireless device, the operations configure the wireless device to:
transmit, to one or more responder stations (STAs) including one of (1) a plurality of responder STAs and (2) the single responder STA including a plurality of antennas, an enhanced sector sweep (ESSW) frame for each of a plurality of transmit (TX) sectors, wherein each of the plurality of TX sectors correspond to a weight vector for a plurality of antennas of the wireless device, each ESSW frame including a sector sweep (SSW) packet appended with a plurality of receive training units to simultaneously train one or more responder STAs;
receive, from the one or more responder STAs, an enhanced SSW feedback (SSW-FB) frame, each SSW-FB frame indicating a TX sector of the plurality of TX sectors and a receive (RX) sector of a corresponding STA of the one or more STAs to be used in communication between the initiator STA and the responder STA, the TX sector determined using the plurality of training units of the ESSW frame, and the enhanced SSW-FB frame including a plurality of transmit training units; and
transmit one or more SSW acknowledgement (SSW-ACK) frames to the one or more responder STAs in a directional transmission in accord with the TX sector in the SSW-FB frame to verify the TX sector to use for communication based on the received TX sector, RX sector, and the plurality of transmit training units of the enhanced SSW-FB frame.

15. The storage medium of claim 14, wherein each of the ESSW frames is transmitted to the second plurality of antennas of only the single responder STA to communicate using a single user multiple input multiple output (SU-MIMO) communication protocol, wherein the ESSW frames include an EESW frame for each of a plurality of transmit (TX) sectors of each of a second plurality of antennas of the wireless device.

16. The storage medium of claim 14, wherein each of the ESSW frames is transmitted to the plurality of responder STAs to communicate using a multiple user (MU) multiple input multiple output (MIMO) communication protocol, wherein the enhanced SSW-FB frames include one enhanced SSW-FB frame from each of the plurality of STAs transmitted before the transmission of the one or more SSW-ACK frames, wherein the SSW-ACK frames include one SSW-ACK frame for each of the plurality STAs that did not indicate a conflicting TX sector in the enhanced SSW-FB frame, and wherein the enhanced SSW-FB frame from each of the plurality of STAs is received in a directional reception in accord with the TX sector indicated in the enhanced SSW-FB frame.

17. A method performed by one or more responder stations (STAs), the method comprising:
receiving, at the one or more responder STAs including one of (1) a plurality of responder stations (STAs) and (2) a single responder STA including a plurality of antennas, an enhanced sector sweep (ESSW) frame for each of a plurality of transmit (TX) sectors, wherein each of the plurality of TX sectors correspond to a weight vector for a plurality of antennas of an initiator STA, each ESSW frame including a sector sweep (SSW) packet appended with a plurality of receive training units;
determining, simultaneously at each of the one or more responder STAs and based on the TRN units, a received signal strength (RSS) of each of the TX sectors and which TX sector corresponds to a highest RSS;
transmitting, from the one or more responder STAs, an enhanced SSW feedback (SSW-FB) frame, each SSW-FB frame indicating the TX sector of the plurality of TX sectors that corresponds to the highest RSS, a receive (RX) sector of a corresponding STA of the plurality of STAs or the single responder STA to be used in communication between the initiator STA and the responder STA, and including a plurality of transmit training units; and
receiving one or more SSW acknowledgement (SSW-ACK) frames from the initiator STA in a directional transmission in accord with the TX sector in the enhanced SSW-FB frame and the transmit training units to verify the TX sector to use for communication.

18. The method of claim 17, wherein the one or more responder STAs includes only the single responder STA with the plurality of antennas, and receiving the ESSW frame for each of the plurality of TX sectors includes receiving at the single STA an ESSW frame for each of a plurality of TX sectors of each of the plurality of antennas of the initiator STA.

19. The method of claim 17, wherein the one or more responder STAs includes the plurality of responder STAs, wherein transmitting the SSW-FB frames includes transmitting one enhanced SSW-FB frame from each of the plurality of responder STAs before receiving the one or more SSW-ACK frames, and wherein the SSW-ACK frames include one SSW-ACK frame for each of the plurality STAs that did not indicate a conflicting TX sector in the enhanced SSW-FB frame.

20. The method of claim 19, wherein transmitting the enhanced SSW-FB frames include one enhanced SSW-FB frame from each of the plurality of STAs, and wherein the enhanced SSW-FB and SSW-ACK frames are interlaced in time and transmitted in a directional transmission in accord with the TX sector determined to correspond to the highest RSS.

* * * * *

UNITED STATES PATENT AND TRADEMARK OFFICE
CERTIFICATE OF CORRECTION

| | |
|---|---|
| PATENT NO. | : 9,999,046 B2 |
| APPLICATION NO. | : 14/978330 |
| DATED | : June 12, 2018 |
| INVENTOR(S) | : Maltsev et al. |

It is certified that error appears in the above-identified patent and that said Letters Patent is hereby corrected as shown below:

In the Claims

In Column 32, Line 17, in Claim 1, delete "antennas:" and insert --antennas;-- therefor In Column 32, Line 67, in Claim 7, delete "omni-direction" and insert --omni-directional-- therefor Signed and Sealed this
Eighth Day of October, 2019

Andrei Iancu
*Director of the United States Patent and Trademark Office*